US 8,000,555 B2

(12) United States Patent
Hirose et al.

(10) Patent No.: US 8,000,555 B2
(45) Date of Patent: Aug. 16, 2011

(54) DEFECTIVE IMAGE DETECTION METHOD AND STORAGE MEDIUM STORING PROGRAM

(75) Inventors: Keiji Hirose, Matsumoto (JP); Kon Ko, Tokyo (JP)

(73) Assignee: Seiko Epson Corporation, Tokyo (JP)

( * ) Notice: Subject to any disclaimer, the term of this patent is extended or adjusted under 35 U.S.C. 154(b) by 1127 days.

(21) Appl. No.: 11/803,496

(22) Filed: May 15, 2007

(65) Prior Publication Data

US 2007/0263943 A1    Nov. 15, 2007

(30) Foreign Application Priority Data

May 15, 2006  (JP) ................................. 2006-135202
May 15, 2006  (JP) ................................. 2006-135203

(51) Int. Cl.
*G06K 9/40* (2006.01)
*G06K 9/00* (2006.01)

(52) U.S. Cl. ......... 382/275; 382/308; 382/257; 382/266

(58) Field of Classification Search .................. 382/257, 382/275

See application file for complete search history.

(56) References Cited

U.S. PATENT DOCUMENTS

| 2002/0015526 A1 | 2/2002 | Nomura et al. |
| 2004/0208395 A1* | 10/2004 | Nomura ......................... 382/275 |
| 2005/0251347 A1* | 11/2005 | Perona et al. ................... 702/19 |

FOREIGN PATENT DOCUMENTS

| GB | 1547811 | 6/1979 |
| JP | 10-232915 | 9/1998 |
| JP | 2001-175878 | 6/2001 |
| JP | 2002-286843 | 10/2002 |
| JP | 2003-101732 | 4/2003 |
| JP | 2004-246554 | 9/2004 |
| JP | 2006-072839 | 3/2006 |

* cited by examiner

*Primary Examiner* — Bhavesh M Mehta
*Assistant Examiner* — Patrick L Edwards
(74) *Attorney, Agent, or Firm* — Nutter McClennen & Fish LLP; John J. Penny, Jr.

(57) ABSTRACT

A method for detecting a defective image of the present invention includes obtaining an edge image by performing an edge tracking process on an original image, detecting an isolation point whose size is equal to or smaller than a predetermined size from a processed image obtained by performing an erosion process after an expansion process on the edge image, and detecting a defective image in the original image based on the isolation point.

10 Claims, 29 Drawing Sheets

BRIGHTNESS IMAGE → EDGE IMAGE

BEFORE
EXPANSION PROCESS

AFTER
EXPANSION PROCESS

EDGE IMAGE     PROCESSED IMAGE

DEFECTIVE IMAGE DETECTION METHOD AND STORAGE MEDIUM STORING PROGRAM

CROSS-REFERENCE TO RELATED APPLICATIONS

The present application claims priority upon Japanese Patent Application Nos. 2006-135202 and 2006-135203 filed on May 15, 2006, which are herein incorporated by reference.

BACKGROUND

1. Technical Field

The present invention relates to defective image detection methods and storage media storing programs.

2. Related Art

If dust is attached to an original, the images of such dust are included in the digital image of the original read by a scanner. For this reason, it is preferable to remove dust on an original with a blower or the like before the original is read. However, it is difficult to completely remove dust from the original.

Therefore, means is proposed for detecting dust images in a digital image to remove the same (see British Patent Publication No. 1547811, specification, JP-A-2003-101732 and JP-A-10-232915).

British Patent Publication No. 1547811, specification, discloses an apparatus for detecting dust on the original using infrared light. However, since provision of hardware such as an infrared light source is required, the apparatus becomes expensive.

JP-A-2003-101732 discloses a technique in which a binary image is subjected to a labeling process so as to enclose an individual image block with a rectangular frame. The image block enclosed with such a rectangular frame that falls under predetermined conditions is judged to be a dust image component. However, since a generation process of the binary images is not clear, it is not certain whether this technique is applicable to any type of image.

(1) Incidentally, while a dust image present in a low spatial frequency region is highly noticeable, a dust image present in a high spatial frequency region is less noticeable. In addition, other than the dust image, noise or the like present in a low spatial frequency region is highly noticeable and those present in a high spatial frequency region are less noticeable.

(2) When determination is made as to whether or not a given image in an original image is the dust image, if the same method is always used for such determination, erroneous detection of the dust image becomes more likely. In addition, when determination is made as to whether or not a given image in an original image is a defective image such as noise, which is not limited to the dust image, if the same method is always used for such determination, erroneous detection of the defective image becomes more likely.

SUMMARY (1) Accordingly, an advantage of a first aspect of the present invention is to detect a defective image (such as dust images and noise) present in a low spatial frequency region.

A primary aspect of the present invention in order to achieve the above advantage is characterized in that an edge tracking process is performed on an original image so as to obtain an edge image, an isolation point having a size equal to or smaller than a predetermined size is detected, from a processed image obtained by performing an erosion process after an expansion process on the edge image, and a defective image in the original image is detected based on the isolation point.

(2) An advantage of a second aspect of the present invention is to detect a defective image (such as dust images and noise) with good accuracy.

A primary aspect of the present invention in order to achieve the above advantage is characterized in that an isolation point is extracted from an original image, a determination method that corresponds to a characteristic of the isolation point is determined from among a plurality of determination methods, whether or not the isolation point relates to a defective image is determined based on the determined determination method, and a defective image is detected from the original image based on the isolation point related to a defective image.

Other features of the invention will become clear through the accompanying drawings and the following description.

BRIEF DESCRIPTION OF THE DRAWINGS

For a more complete understanding of the invention and the advantages thereof, reference is now made to the following description taken in conjunction with the accompanying drawings wherein:

FIG. 30 is an explanatory diagram of the dust removal process using a median filter;

FIG. 31 is an explanatory diagram showing a problem in the dust removal process using the median filter;

Figure 1:
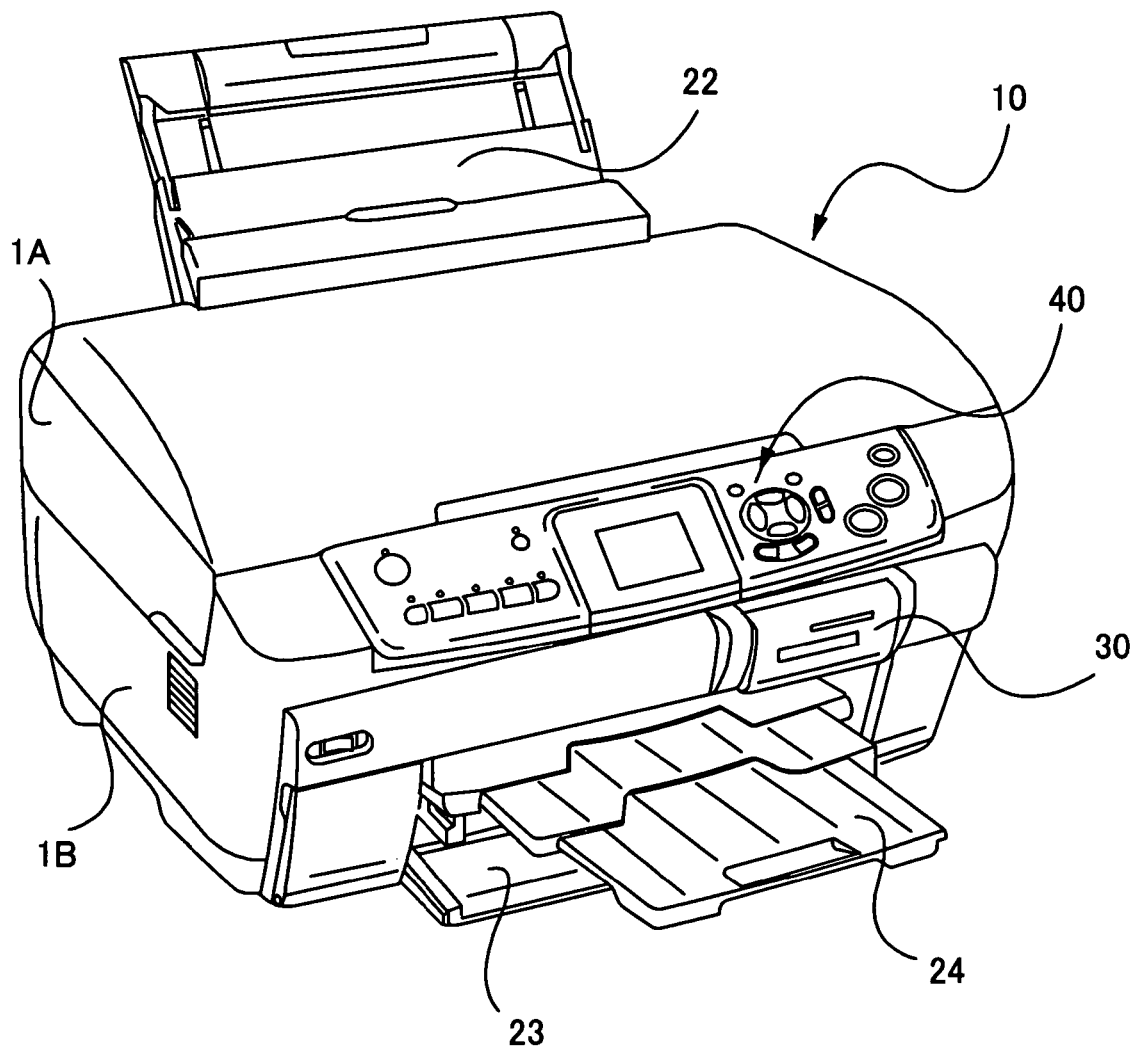
FIG. 1 is an overall perspective view of a multifunctional machine.

Although the preferred embodiment of the present invention has been described in detail, it should be understood that various changes, substitutions and alterations can be made therein without departing from spirit and scope of the inventions as defined by the appended claims.

DESCRIPTION OF EXEMPLARY EMBODIMENTS

At least the following matters will be made clear by the explanation in the present specification and the description of the accompanying drawings.

A method for detecting a defective image including:

Obtaining an edge image by performing an edge tracking process on an original image;

detecting an isolation point having a size equal to or smaller than a predetermined size, from a processed image obtained by performing an erosion process after an expansion process on the edge image; and detecting a defective image in the original image based on the isolation point.

With such a defective image detection method, it is possible to detect defective images in the region having a low spatial frequency.

In such a defective image detection method, it is preferable that a position of the isolation point in the processed image is stored, and an image in the original image that corresponds to the position is detected as the defective image. With such a defective image detection method, the position of the defective image in the original image can be obtained.

In such a defective image detection method, it is preferable that in the edge tracking process, a brightness image is obtained from the original image, and the edge image is obtained by applying a filter to the brightness image. With such a defective image detection method, the edge image indicating the contour of the target object in the original image can be obtained.

In such a defective image detection method, it is preferable that in the expansion process, when an edge pixel is present in a neighborhood area of a pixel of interest, the pixel of interest is converted to the same pixel as the edge pixel, and, in the erosion process, when a non-edge pixel is present in a neighborhood area of a pixel of interest, the pixel of interest is converted to a pixel that is not the edge pixel. By performing the erosion process after the expansion process, it is possible to detect the defective image by detecting the isolation point whose size is equal to or smaller than a predetermined size.

Also, it is preferable that the neighborhood area in the expansion process and the neighborhood area in the erosion process have the same size. Consequently, it is possible to detect the defective image in the original image in an adequate size (not too large or too small).

Also, it is preferable that the size of the neighborhood area is changed in accordance with a reading resolution of an original used in obtaining the original image. By performing the erosion process after the expansion process, it is possible to detect the defective image by detecting the isolation point whose size is equal to or smaller than a predetermined size.

In such a defective image detection method, it is preferable that a shape of the isolation point is obtained, so as to change a method for determining whether or not the isolation point relates to the defective image depending on the shape. Also, it is preferable that when the isolation point is determined to be spot-shaped, the isolation point having a value smaller than a first threshold value is determined to be related to the defective image, and when the isolation point is determined to be line-shaped, the isolation point having a value smaller than a second threshold value is determined to be related to the defective image, and the first threshold value is smaller than the second threshold value. In this manner, it is possible to detect the defective image with good accuracy.

In such a defective image detection method, it is preferable that a rectangular region that surrounds the isolation point is determined, and a method for determining whether or not the isolation point relates to the defective image is changed depending on a ratio of an area occupied by the isolation point to an area of a square whose side length is equal to a longer side length of the rectangular region. Also, it is preferable that when the ratio is larger than a predetermined value, the isolation point having a ratio smaller than a first threshold value is determined to be related to the defective image, when the ratio is equal to or smaller than the predetermined value, the isolation point having a ratio smaller than a second threshold value is determined to be related to the defective image, and, the first threshold value is smaller than the second threshold value. In this manner, it is possible to detect the defective image with good accuracy.

A program causing an image processing apparatus to:

obtain an edge image by performing an edge tracking process on an original image;

obtain a processed image by performing an erosion process after an expansion process on the edge image, detect an isolation point having a size equal to or smaller than a predetermined size, from the processed image; and detect a defective image in the original image based on the isolation point.

With such a program, it is possible to cause the image processing apparatus detect the defective image in the region having a low spatial frequency.

An image processing apparatus including an arithmetic processing section and a storing section, wherein the arithmetic processing section performs an edge tracking process on an original image, and stores an edge image in the storing section, the arithmetic processing section performs an erosion process after an expansion process on the edge image, and stores a processed image in the storing section, the arithmetic processing section detects an isolation point whose size is equal to or smaller than a predetermined size from the processed image, and detects a defective image in the original image based on the isolation point.

With such an image processing apparatus, it is possible to detect the defective image in the region having a low spatial frequency.

A method for detecting a defective image including:

extracting an isolation point from an original image, determining a determination method that corresponds to a characteristic of the isolation point from among a plurality of determination methods;

determining whether or not the isolation point relates to a defective image based on the determined determination method; and detecting a defective image from the original image based on the isolation point related to a defective image.

With such a defective image detection method, it is possible to detect the defective image with good accuracy.

In such a defective image detection method, it is preferable that when the determination method that corresponds to the characteristic of the isolation point is determined from among the plurality of determination methods, a shape of the isolation point is obtained, and the method for determining whether or not the isolation point relates to the defective image is determined depending on the shape. It is preferable that when the isolation point is determined to be spot-shaped, whether or not the isolation point relates to the defective image is determined based on a first threshold value, when the isolation point is determined to be line-shaped, whether or not the isolation point relates to the defective image is determined based on a second threshold value that is different from the first threshold value. Also, it is preferable that the first threshold value is smaller than the second threshold value. In this manner, it is possible to detect the defective image with good accuracy.

In such a defective image detection method, it is preferable that when the determination method that corresponds to the characteristic of the isolation point is determined from among the plurality of determination methods, a rectangular region that surrounds the isolation point is determined, and the method for determining whether or not the isolation point relates to the defective image is determined depending on a ratio of an area occupied by the isolation point to an area of a square whose side length is equal to a longer side length of the rectangular region. It is preferable that when the ratio is larger than a predetermined value, whether or not the isolation point relates to the defective image is determined based on a first threshold value, when the ratio is equal to or smaller than the predetermined value, whether or not the isolation point relates to the defective image is determined based on a second threshold value that is different from the first threshold value. Also, it is preferable that the first threshold value is smaller than the second threshold value. In this manner, it is possible to detect the defective image with good accuracy.

In such a defective image detection method, it is preferable that when the isolation point is extracted from the original image, an edge image is obtained by performing an edge tracking process on the original image, and an isolation point whose size is equal to or smaller than a predetermined size is detected from a processed image obtained by performing an erosion process after an expansion process on the edge image. In this manner, it is possible to detect the defective image in the region having a low spatial frequency.

A program causing an image processing apparatus to extract an isolation point from an original image;

determine a determination method that corresponds to a characteristic of the isolation point from among a plurality of determination methods;

determine whether or not the isolation point relates to a defective image based on the determined determination method; and, detect a defective image from the original image based on the isolation point related to the defective image.

With such a program, it is possible to cause the image processing apparatus to detect the defective image with good accuracy.

An image processing apparatus including an arithmetic processing section and a storing section, wherein the arithmetic processing section extracts an isolation point from an original image stored in the storing section;

the arithmetic processing section determines a determination method that corresponds to a characteristic of the isolation point from among a plurality of determination methods;

the arithmetic processing section determines whether or not the isolation point relates to a defective image based on the determined determination method; and, the arithmetic processing section detects a defective image from the original image based on the isolation point related to the defective image.

With such an image processing apparatus, it is possible to detect the defective image with good accuracy.

Outline of the Multifunctional Machine

Figure 2:
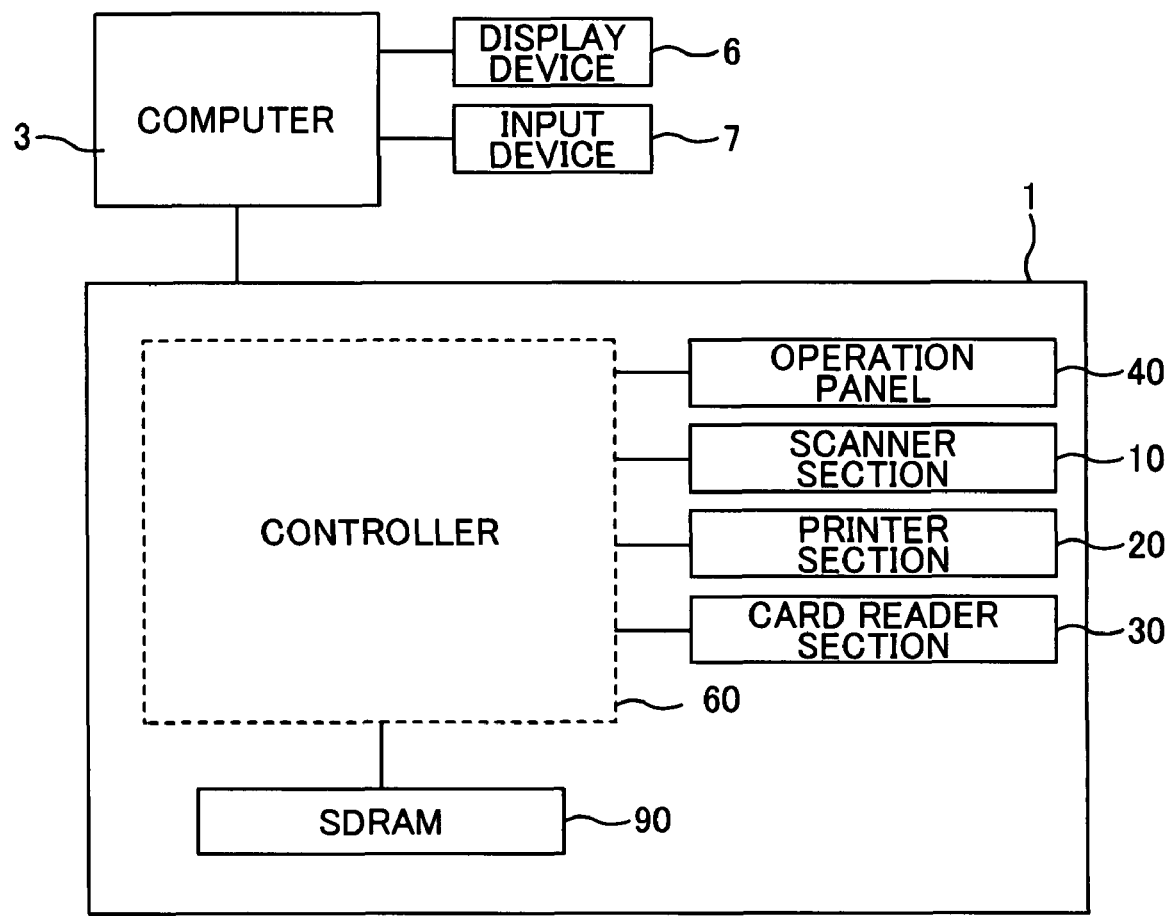
FIG. 2 is a block diagram of a configuration of the multifunctional machine.

FIG. 1 is an overall perspective view of a multifunctional machine. FIG. 2 is a block diagram of a configuration of the multifunctional machine. A multifunctional machine 1 has a scanner function for reading an image from an original, a printer function for printing an image on paper based on print data from a computer 3 (external apparatus), and a copy function for printing an image read from an original on paper.

The multifunctional machine 1 includes a scanner section 10, a printer section 20, a card reader section 30, an operation panel 40, a controller 60 and an SDRAM 90. Main constituent elements of the scanner section 10 are provided in an upper accommodation section 1A of the multifunctional machine 1. Main constituent elements of the printer section 20 are provided in a lower accommodation section 1B of the multifunctional machine 1. The card reader section 30 is provided in a front face of the lower accommodation section 1B such that the user can easily set a memory card. The operation panel 40 is provided in a front face of the upper accommodation section 1A to enable the user to easily operate it. The controller 60 is provided on a substrate in the lower accommodation section 1B.

To the computer 3, which is an external apparatus, a display device 6 such as a display, or an input device 7 such as a keyboard or a mouse are connected. As described later, drivers for the multifunctional machine 1 are pre-installed on the computer 3. These drivers include a printer driver or a scanner driver, for example. The driver is a program for causing the computer 3 to control the multifunctional machine 1, which is composed of a program code for carrying out various processes. The computer 3 includes an arithmetic processing section such as a CPU, and hardware for storing data such as a memory.

Figure 3:
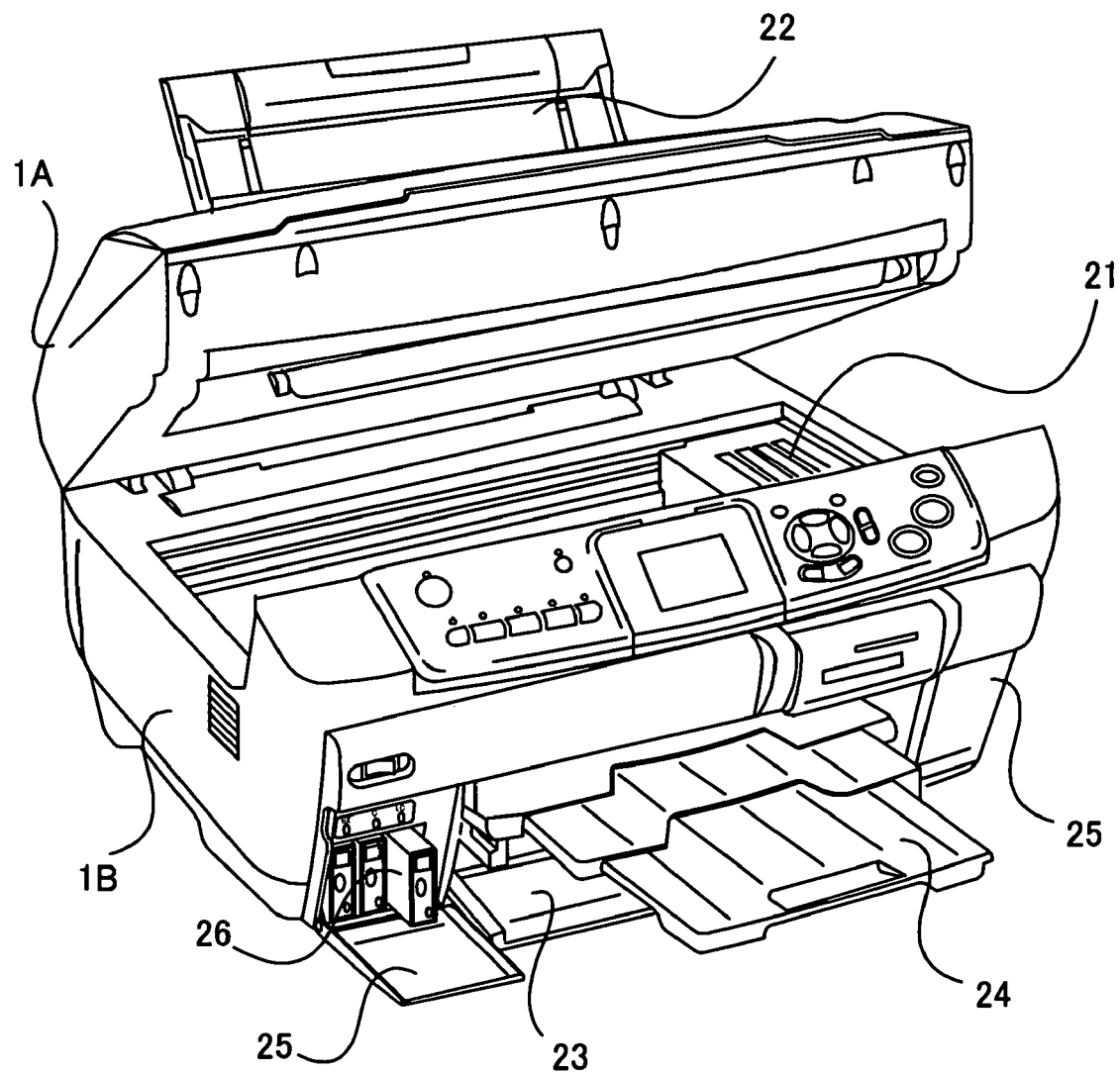
FIG. 3 is an explanatory diagram of a printer section.

FIG. 3 is an explanatory diagram of the printer section. FIG. 3 shows a state in which the upper accommodation section 1A of the multifunctional machine 1 is raised so as to expose the printer section 20.

The printer section 20 includes a transport unit (not shown) for transporting paper and a carriage 21 for moving a head that ejects ink. The printer section 20 alternately repeats a transporting operation for causing the transport unit to transport paper, and a dot formation operation for ejecting ink from the moving head so as to form dots on the paper, thereby printing an image on the paper. The unshown transport unit supplies paper set to a rear paper supply tray 22 in a back face of the multifunctional machine 1, or a front paper supply tray 23 in the front face of the multifunctional machine 1, and discharges paper on which printing has been performed to a paper discharge tray 24 in the front face of the multifunctional machine 1.

On the left and right sides on the front face of the lower accommodation section 1B, ink cartridge covers 25 are provided. When an ink cartridge 26 is attached or replaced, the user opens this ink cartridge cover 25 to attach or replace the ink cartridge 26. By the user closing the ink cartridge cover 25 after attaching or replacing the ink cartridge 26, setting of the ink cartridge 26 is completed. The ink cartridge 26 contains ink, which is supplied to the head so as to be ejected from the head.

Figure 4:
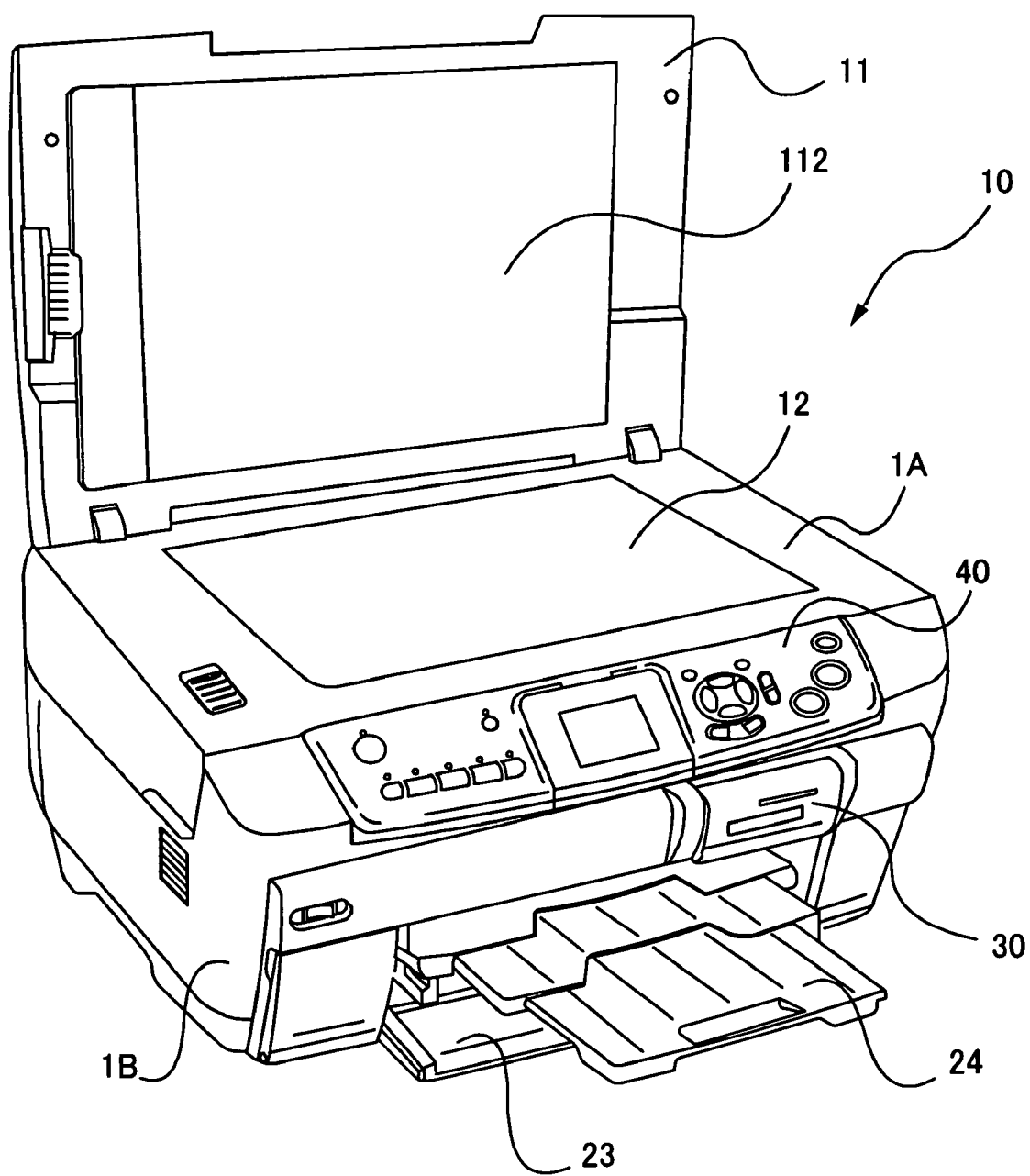
FIG. 4 is an explanatory diagram of a scanner section.

FIG. 4 is an explanatory diagram of the scanner section. FIG. 4 shows a state in which a top cover 11 of the multifunctional machine 1 is opened.

The scanner section 10 includes the top cover 11 and an original table glass 12. A white original mat 112 is attached to the top cover 11. When the top cover 11 is closed with an original placed on the original table glass 12, the original is set flat between the original mat 112 and the original table glass 12. Below the original table glass 12, other constituent elements of the scanner section 10 such as a reading carriage are arranged.

Figure 5:
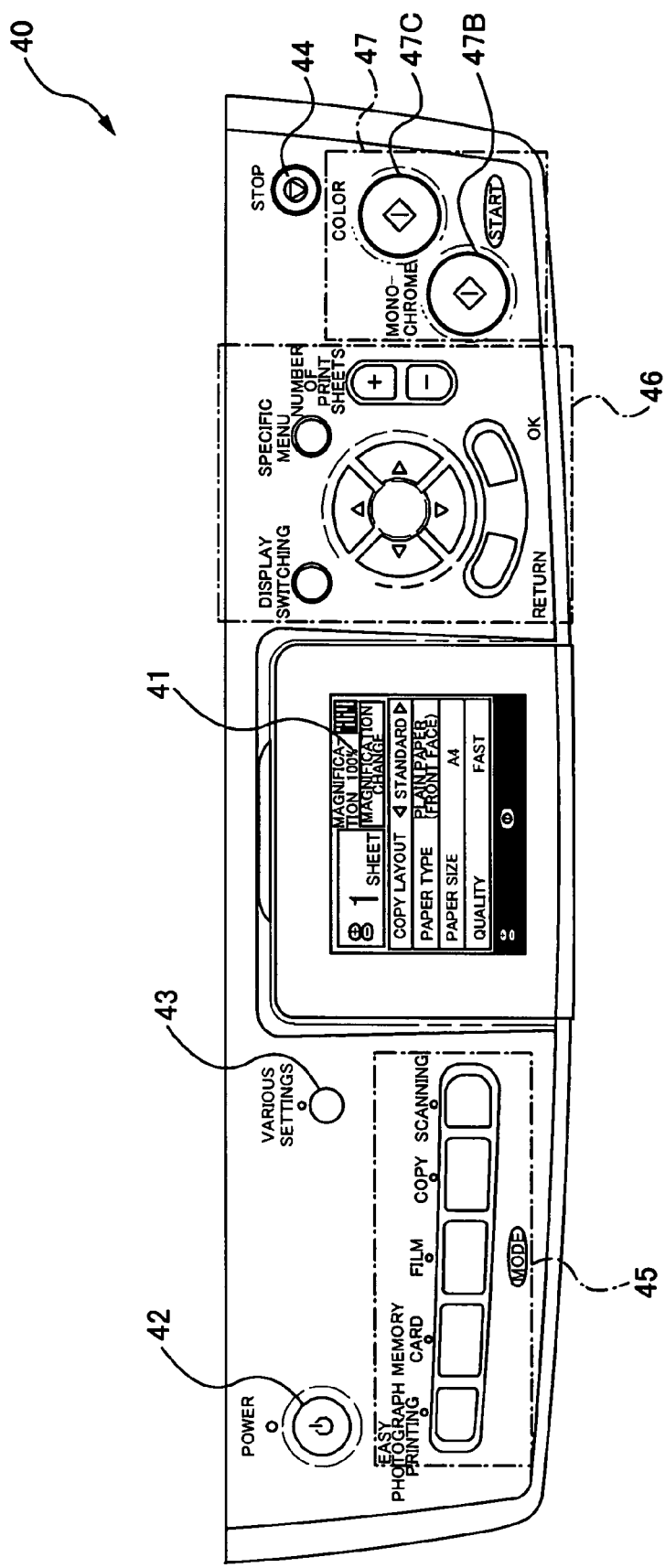
FIG. 5 is an explanatory diagram of an operation panel.

FIG. 5 is an explanatory diagram of the operation panel.

The operation panel 40 includes a liquid crystal display 41 and various buttons. Examples of the various buttons include a power button 42, a setting button 43, a stop button 44, a mode selection button 45, a cursor operation button group 46, and a start button 47. The power button 42 is used for power-on/power-off operation of the multifunctional machine 1. The setting button 43 is used for setting and confirmation with respect to head cleaning, nozzle checking and ink remaining amount, for example. The stop button 44 is used to stop the function being performed. The mode selection button 45 is used for selecting the function of the multifunctional machine 1. The cursor operation button group 46 is used for setting items displayed on the liquid crystal display 41, for example. The start button 47 includes a color button 47C and a monochrome button 47B, and is used to start color printing or monochrome printing.

On the liquid crystal display 41, not only various setting screens such as the one shown in FIG. 5, but also image data stored in a memory card read by the card reader section 30 are displayed.

Overview of Various Functions of the Multifunctional Machine

Next, various functions of the multifunctional machine 1 are described with reference to FIG. 2. As described below, the multifunctional machine 1 has a printer function, scanner function and copy function, as its main functions.

Printer Function

A printer driver for the multifunctional machine 1 is pre-installed on the computer 3. The printer driver causes the computer 3 to convert image data generated by an application program or the like to print data. The print data includes command data and pixel data. The command data is for controlling the printer section 20 of the multifunctional machine 1. The pixel data is data on the presence, color and tone of dots constituting a printed image, and is four-tone CMYK color space data (CMYK 2-bit data). The printer driver causes the computer 3 to transmit the print data to the multifunctional machine 1.

The controller 60 separates the print data transmitted from the computer 3 into the command data and pixel data, and buffers the separated data in the SDRAM 90. Then, the controller 60 controls the printer section 20 based on the received command data so as to cause the head to eject ink based on the pixel data, thereby performing printing. Specifically, ink is ejected from the head based on the CMYK 2-bit data, and large dots, medium dots and small dots are formed for the respective pixels on paper.

The multifunctional machine 1 performs the above-described processes so as to function as a printer.

Scanner Function

A scanner driver for the multifunctional machine 1 is pre-installed on the computer 3. The user performs settings of the scanner driver through the computer 3, such as settings of reading resolution, reading scope or the like. The user sets an original on the scanner section 10, thereafter instructs start of scanning via the scanner driver through the computer. Then, the scanner driver causes the computer 3 to transmit to the multifunctional machine 1 control data that corresponds to the settings set by the user.

The controller 60 controls the scanner section 10 based on the control data transmitted from the computer 3, and obtains image data of the original from the scanner section 10. Specifically, the controller 60 obtains the image data constituted by 256-gradation RGB color space pixel data (RGB 8-bit data). Then, the controller 60 transmits the obtained image data to the computer 3.

The multifunctional machine 1 performs the above-described processes so as to function as a scanner.

The user may press the start button 47 after setting the original on the scanner section 10. When the start button 47 is pressed, the scanner driver installed on the computer 3 is automatically activated, and the image data obtained from the scanner section 10 is automatically transmitted to the scanner driver installed on the computer 3 by the controller 60.

Copy Function

The user operates the operation panel 40 to perform various settings, for example, settings on the paper size, original size, magnification ratio, and copy mode (fast/fine). When the user presses the start button 47 of the operation panel 40 after an original is set on the scanner section 10, a start signal for instructing start of copying is transmitted from the operation panel 40 to the controller 60. The controller 60 transmits control data that corresponds to the settings set by the user to the scanner section 10. The scanner section 10 reads the original in accordance with the control data, and transmits image data constituted by RGB 8-bit pixel data to the controller 60. The controller 60 buffers the image data transmitted from the scanner section 10 in the SDRAM 90.

Next, the controller 60 converts the image data obtained from the scanner section 10 to the print data. The image data transmitted from the scanner section 10 is constituted by the RGB 8-bit pixel data, and the controller 60 performs a color conversion process, a halftone process, and an interlace process on the RGB 8-bit data, and buffers the generated print data in the SDRAM 90. Then, the controller 60 controls the printer 20 in accordance with the print data buffered in the SDRAM 90, thereby performs printing.

The multifunctional machine 1 performs the above-described processes so as to function as a copier.

Film Scanner Function

Film Scanning

The scanner section 10 of the multifunctional machine 1 can, not only read an image on a paper original, but also read a photographic image of a film such as a 35 mm film.

Figure 6:
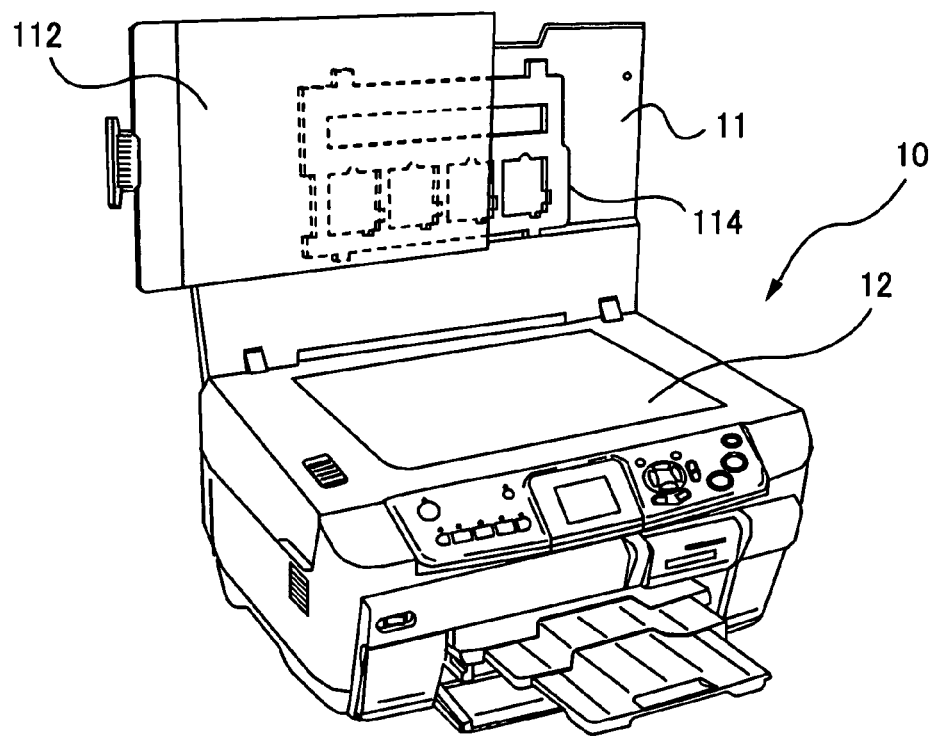
FIG. 6 is an explanatory diagram showing a storing space of a film holder.
Figure 7:
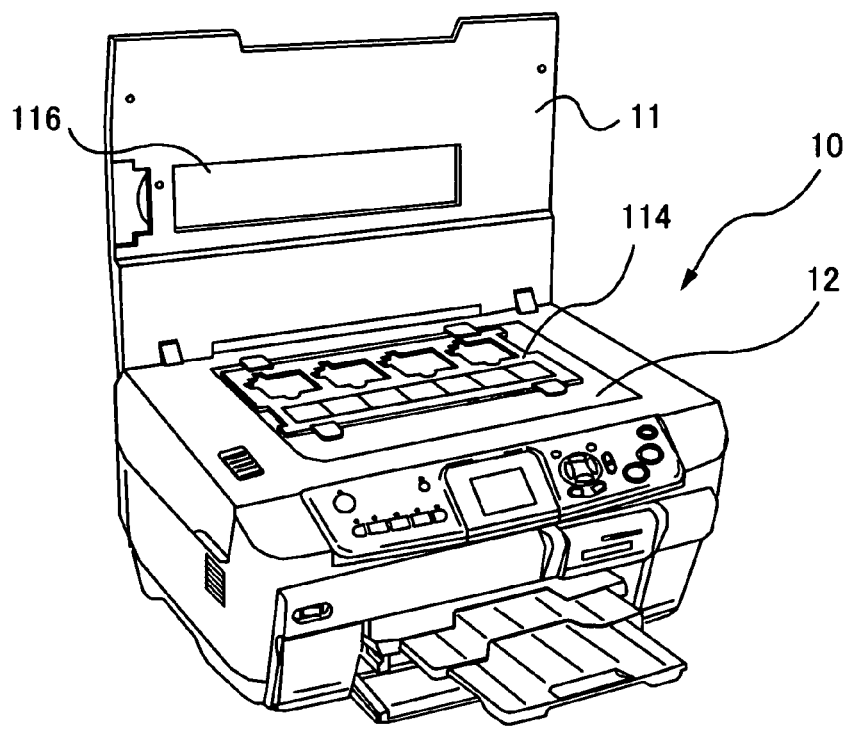
FIG. 7 is a diagram illustrating a state in which the film holder is set for reading a film.

FIG. 6 is an explanatory diagram showing a storing space of a film holder. FIG. 7 is a diagram illustrating a state in which the film holder is set for reading a film.

A film holder 114 and a light source for transparent original 116 are provided to the top cover 11, in addition to the original mat 112. The user can take out the film holder 114 from the top cover 11 by removing the original mat 112 from the top cover 11. In order to set a film to be read, the user sets the film on the film holder 114, sets the film holder 114 on the original table glass 12 and closes the top cover 11. At this time, the film held by the film holder 114 and the light source for transparent original 116 oppose to each other, in which state the image can be read from the film.

Processes performed thereafter are the same as the case in which the original is paper document.

Scanner Driver

Figure 8:
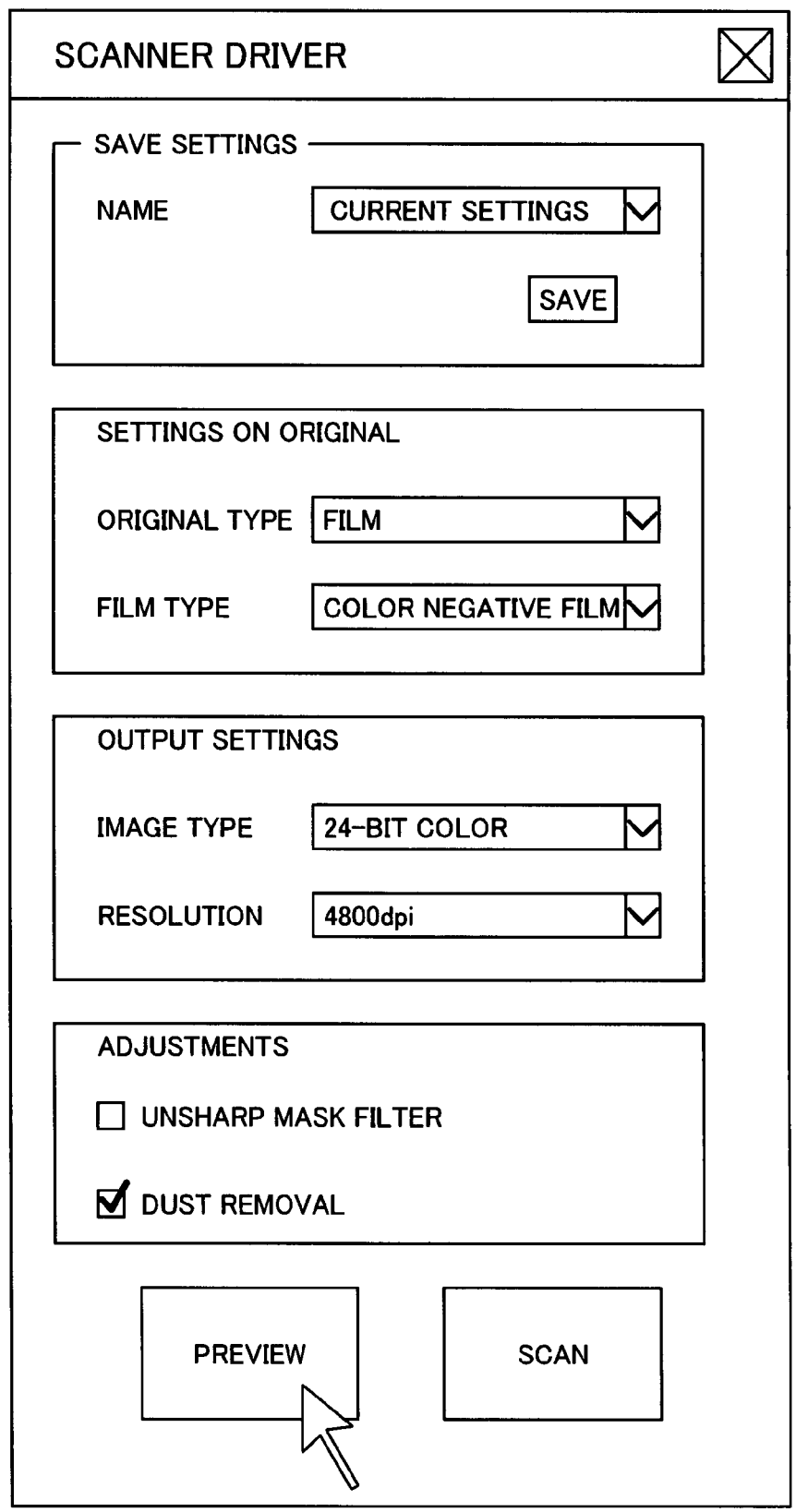
FIG. 8 is an explanatory diagram of a user interface of a scanner driver.

FIG. 8 is an explanatory diagram of a user interface of the scanner driver. When the scanner driver of the computer 3 is activated, a user interface is displayed on the display device 6. The user can perform various settings of the scanner driver through the user interface, by using the input device 7 connected to the computer 3.

The user interface is constituted by a settings saving section, an original settings section, an output settings section, an adjustment section, a preview button and a scan button.

The settings saving section is used to save certain setting conditions with a setting name assigned thereto. Also, the settings saving section is used in order to select an already-saved setting conditions from a pull-down menu.

The original settings section is used for setting the type of the original, etc. When an image is read from a film, the user selects "film" from the pull-down menu for "original type". When "film" is selected from the pull-down menu for "original type", "color negative film", "positive film" or "monochrome negative film" become selectable in the pull-down menu for "film type". Then, the user performs settings of "film type" in accordance with the film set on the original table glass 12.

The output settings section is used when setting reading conditions. When the user reads an image from a color photographic film, the user selects "24-bit color" or "48-bit color" from the pull-down menu for "image type". When the user reads an image from a monochrome photographic film, the user selects "16-bit gray" or "8-bit gray" from the pull-down menu for "image type". In addition, the user can set a "resolution" through the pull-down menu. The resolution refers to a unit that indicates the density of the points at which an image is read from the original. For example, when the "resolution" is set to "4,800 dpi", reading is performed at 4,800 points per inch, i.e., 4,800×4,800 points per square inch. When "original type" in the original settings section is set to "film", since the area to be read is small, it is necessary to set the "resolution" to a high resolution.

The adjustment section is used for performing certain adjustments to the image read from the original. The user performs settings in the adjustment section by checking the checkbox in the adjustment section. The scanner driver performs image processing on the image data obtained from the multifunctional machine 1 in accordance with the settings in the adjustment section. In this case, since the checkbox for "dust removal" is checked, the scanner driver performs image processing for dust removal on the image data. This image processing for dust removal will be described later.

When the preview button is pressed, the scanner driver causes the scanner section 10 to read the original at a low resolution and display the image data obtained from the multifunctional machine 1 on the display device 6 as a preview screen (not shown). The user can set a reading scope on the preview screen. It should be noted that when the preview button is pressed, the scanner driver displays the image data obtained from the multifunctional machine 1 on the display device 6 without performing the image processing set in the adjustment section, in order to promptly display the preview screen.

When the scan button is pressed, the scanner driver causes the scanner section 10 to read the original under the set conditions, and saves the image data obtained from the multifunctional machine 1 in a hard disk, etc. When certain image processing is performed on the image data according to the settings in the adjustment section, the scanner driver saves the image data on which such image processing has been performed.

Incidentally, when dust is attached to the original, images of such dust (dust images) are included in the image read by the scanner section 10. For this reason, dust on the original is desirably removed with a blower or the like before it is read. However, it is difficult to completely remove such dust, and fine dust remains attached to the original. However, the effect of such fine dust is negligible when the original is read at a low resolution.

On the other hand, when a film is read, "resolution" in the output settings section is set to a comparatively high resolution. Therefore, even if fine dust is attached to the film, the images thereof appear in the read image. For this reason, it is desirable that the user checks the checkbox for "dust removal" when a film is read.

In the case where the checkbox for "dust removal" is checked, when the scanner button is pressed, the scanner driver performs a dust detection process on the image data obtained from the multifunctional machine 1, and performs a dust removal process. Now, the dust detection process and the dust removal process will be described.

Dust Detection Process

The dust detection process is a process for detecting a dust image from an image (original image) represented by image data (original image data) obtained from the multifunctional machine 1.

First, the image data to be processed will be described, and then the dust detection process will be described.

Image Data

Figure 9:
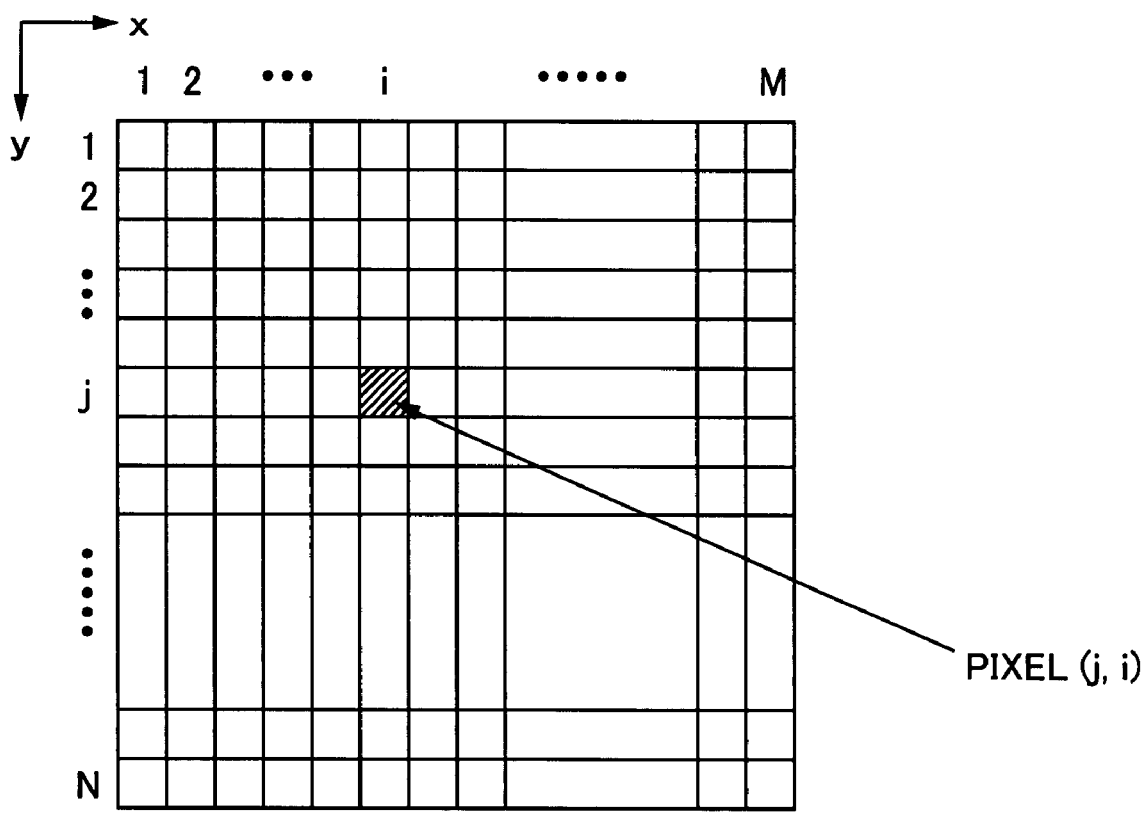
FIG. 9 is an explanatory diagram of an image constituted by M×N pixels.

FIG. 9 is an explanatory diagram of an image constituted by M×N pixels. A pixel is a minimum component element that constitutes an image, and an image is constituted by pixels arranged in a two-dimensional matrix. The image shown in FIG. 9 is constituted by pixels arranged in a matrix of M pixels in the x direction (horizontal or lateral direction)×N pixels in the y direction (vertical or longitudinal direction). A pixel that is the i-th pixel in the x direction and the j-th pixel in the y direction (the pixel indicated by diagonal lines in FIG. 9) is referred to as "pixel (j, i)". It should be noted that pixel data corresponding to the pixel (j, i) is referred to as "pixel data (j, i)". The pixel data (j, i) is also described as Pji.

The image data (original image data) obtained from the multifunctional machine 1 is constituted by a plurality of pieces of pixel data. The image (original image) represented by the original image data is also constituted by pixels arranged in a two-dimensional matrix. Each pixel has its corresponding pixel data, and each pixel expresses a tone that corresponds to such corresponding pixel data.

The pixel data is RGB color space data, which is also referred to as the "RGB data". Each pixel data is made up of R data representing an R (red) tone, G data representing a G (green) tone, and B data representing a B (blue) tone. Each of the R data, G data and B data is 8-bit data, and can express its color tone in 256 levels.

The scanner driver performs the dust detection process described below on such image data.

Overview of the Dust Detection Process

Figure 10:
FIG. 10 is an example of an original image represented by original image data.

FIG. 10 is an example of the original image represented by the original image data. This original image data indicates a photograph of a yacht basin.

Figure 11:
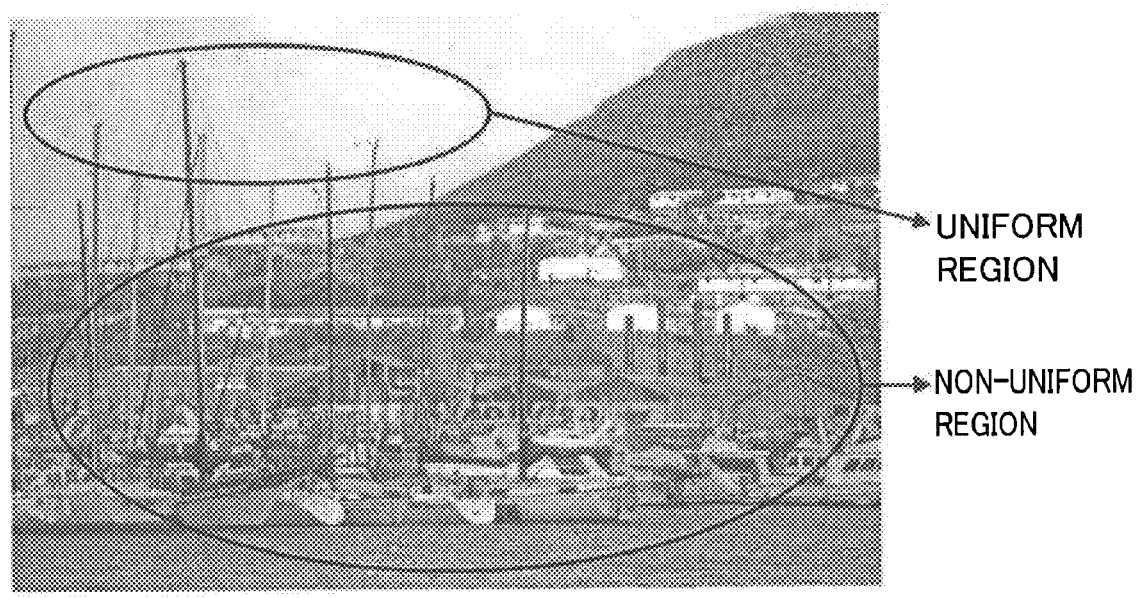
FIG. 11 is an explanatory diagram for a uniform region and a non-uniform region.

FIG. 11 is an explanatory diagram for a uniform region and a non-uniform region.

The uniform region is an image region having a low spatial frequency. For example, since the region of the sky image located on the upper left side of the image has a low spatial frequency, it is the uniform region. This uniform region includes few contours of the target objects. In addition, in the uniform region, pixel data of adjacent pixels changes continuously.

The non-uniform region is an image region having a high spatial frequency. For example, since the region including the images of a plurality of yachts and buildings located in the lower half of the image has a high spatial frequency, it is the non-uniform region. This non-uniform region includes many contours of the target objects. In addition, in the non-uniform region, pixel data of adjacent pixels changes discontinuously.

The uniform region and non-uniform region are not clearly distinguished. For example, the images of the masts or stays (a wire rope extended from the top of a mast), etc., of the yachts are present in the sky image region. It should be noted that the images of the target objects contained in the original image (such as yachts, mountain, buildings, masts and stays) and the dust images are also referred to as the "object image".

Incidentally, the dust image is highly noticeable when it is present in the uniform region. On the other hand, the dust image is less noticeable when it is present in the non-uniform region. Besides, when an attempt is made to remove the dust image in the non-uniform region, the image of the target object tends to be damaged, and therefore it is conceived that the image quality is rather deteriorated.

In view of the above, the present embodiment does not detect the dust image in the non-uniform region, but detects only the dust image in the uniform region.

Also, in determining dust, it is required to change the determination method depending on the shape of the dust. When the dust is determined based on the size of a rectangular region that surrounds the dust image, if the size of the rectangular region is set in accordance with the spot-shaped dust, the line-shaped dust may not be determined. When the size of the rectangular region is set in accordance with the line-shaped dust, the size of the rectangular region needs to be set large. As a result, the image of the target object, which is not dust, may be determined to be a dust image.

In view of this, the present embodiment changes the dust determination method depending on whether dust is spot-shaped or line-shaped.

Figure 12:
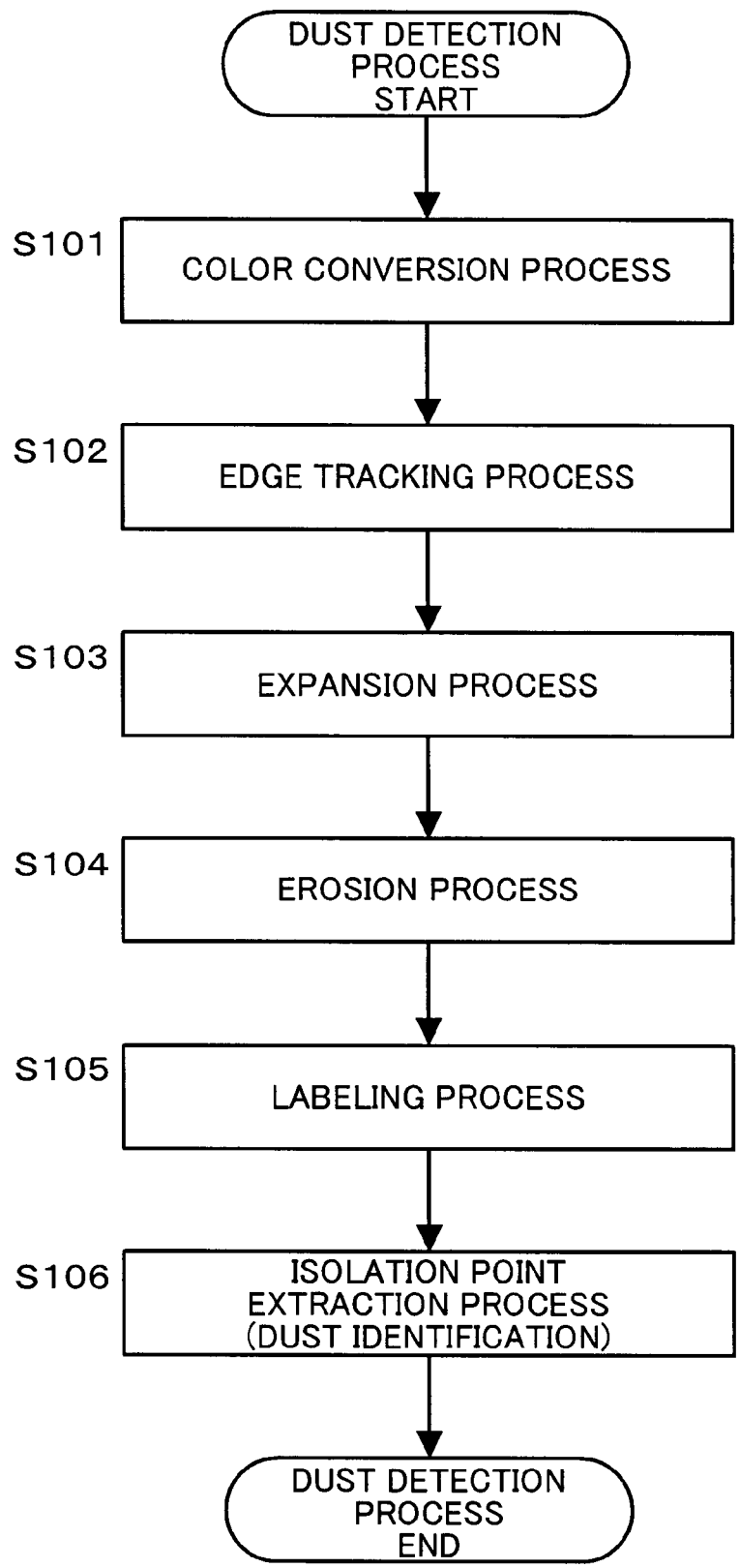
FIG. 12 is a flowchart of a dust detection process.

FIG. 12 is a flowchart of the dust detection process. The dust detection process is performed by the scanner driver causing the computer 3 to perform image processing on the image data. That is, the scanner driver includes a program code for causing the computer 3 to perform various processes in FIG. 12. The various processes are described below.

Color Conversion Process (S101)

In a color conversion process, the computer 3 converts original image data in the RGB color space to image data in the YUV color space. In other words, in the color conversion process, the computer 3 converts pixel data in the RGB color space into pixel data in the YUV color space. More specifically, in the color conversion process, the computer 3 converts an original image in the RGB color space into an image in the YUV color space.

Pixel data after being subjected to the color conversion is also referred to as the "YUV data" since it is converted to data in the YUV color space. The YUV data is made up of Y data representing a tone value of Y (brightness), U data representing a tone value of U (color difference) and V data representing a tone value of V (color difference). That is, in the color conversion process, the computer 3 converts the RGB data of each pixel to the YUV data.

The following equations are used to convert the RGB data to the YUV data.

$$Y=0.299R+0.587G+0.114B$$

$$U=-0.147R-0.289G+0.437B$$

$$V=0.615R-0.515G-0.100B$$

It should be noted that it is not necessary to calculate the U data and V data representing tone values of the color difference. It is also possible to convert the RGB data to data in the YIQ color space, instead of the data in the YUV color space. In short, it is sufficient if the Y data is obtained.

With this color conversion process, the computer 3 can obtain image data of brightness. The image data of brightness is referred to as the "brightness image data", and an image represented by the brightness image data is referred to as the "brightness image".

Edge Tracking Process (S102)

In an edge tracking process, the computer 3 calculates edge image data representing the contour of the object image based on the brightness image data. In other words, in the edge tracking process, the computer 3 calculates pixels (edge pixels) corresponding to the contour of the object image based on the Y data. More specifically, in the edge tracking process, the computer 3 calculates an edge image based on the brightness image.

Figures 13, 14A, 14B:
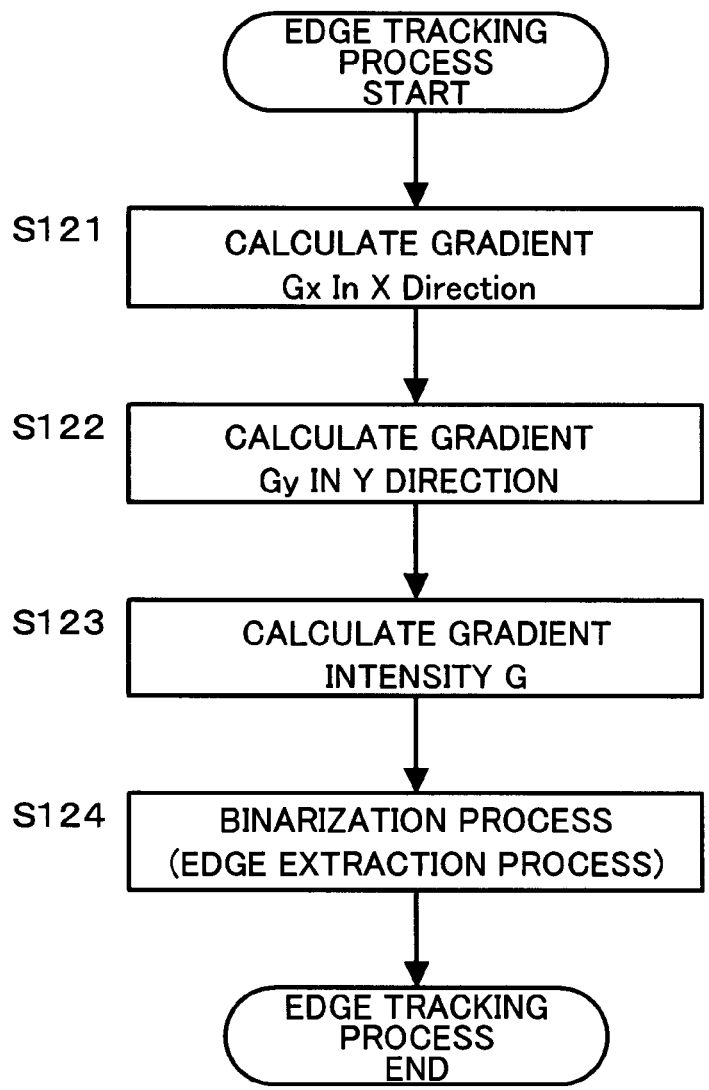
FIG. 13 is a flowchart of an edge tracking process.
FIG. 14A is an explanatory diagram of a Sobel filter used when calculating a gradient in the x direction.
FIG. 14B is an explanatory diagram of a Sobel filter used when calculating a gradient in the y direction.

FIG. 13 is a flowchart of the edge tracking process.

FIG. 14A is an explanatory diagram of a Sobel filter used when calculating a gradient in the x direction, and FIG. 14B is an explanatory diagram of a Sobel filter used when calculating a gradient in the y direction.

Initially, the computer 3 applies an x direction Sobel filter to the Y data to calculate a gradient in the x direction (S121) The Sobel filter is a filter made up of 9 elements (3×3). The gradient data in the x direction corresponding to the pixel (j, i) is referred to as the "gradient data Gx (j, i)". The gradient data Gx (j, i) is calculated as the sum of products of the Y data of each of 3×3 pixels centering on the pixel (j, i) and the elements of the Sobel filter corresponding thereto. Specifically, the gradient data Gx (j, i) is calculated as follows.

$$Gx(j,i)=\{Y(j-1,i+1)+2\times Y(j,i+1)+Y(j+1,i+1)\}-\{Y(j-1,i-1)+2\times Y(j,i-1)+Y(j+1,i-1)\}$$

Similarly, the computer 3 applies a y direction Sobel filter to the Y data to calculate a gradient data Gy (j, i) in the y direction (S122).

The x direction gradient data shows a large value when the brightness difference between pixels adjacent to each other in the x direction is large. Similarly, the y direction gradient data shows a large value when the brightness difference between pixels adjacent to each other in the y direction is large.

Next, the computer 3 calculates intensity data G representing the intensity of gradient for each pixel based on the x direction gradient data Gx and the y direction gradient data Gy. The intensity data G is calculated as follows.

$$G(j,i)=\sqrt{(\{Gx(j,i)\}^2+\{Gy(j,i)\}^2)}$$

Finally, the computer 3 performs a binarization process on the intensity data G. When the maximum value of the intensity data G for all the pixels is assumed to be Gmax, if G (j, i)/Gmax is not less than a threshold value, [1] is assigned to the pixel (j, i), if G (j, i)/Gmax is less than the threshold value, [0] is assigned to the pixel (j, i), thereby the binarization process is performed. The binary data corresponding to the pixel (j, i) after being subjected to the binarizaition process is referred to as the "edge pixel data E (j, i)" or simply, "pixel data (j, i)". The image data constituted by the edge pixel data is referred to as the "edge image data", and the image represented by the edge image data is referred to as the "edge image". The edge image is a binary image.

Figure 15A:
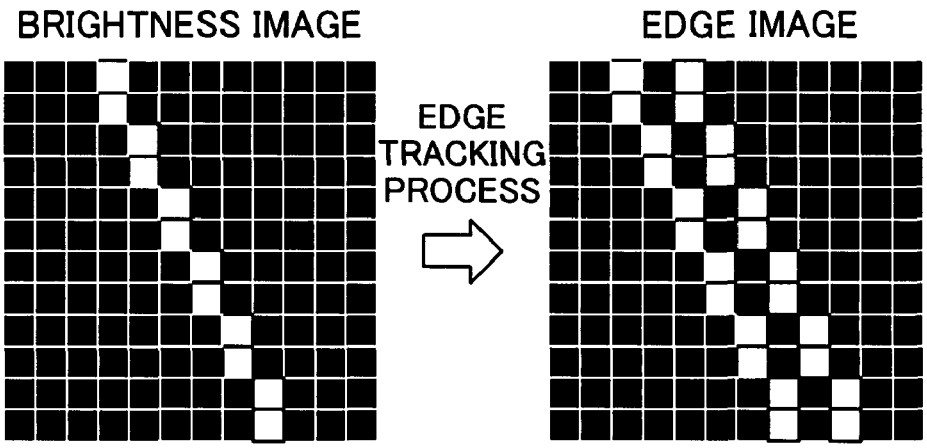
FIGS. 15A to 15C are explanatory diagrams of the relationship between a brightness image and an edge image, in which grids indicate pixels.
Figure 15B:
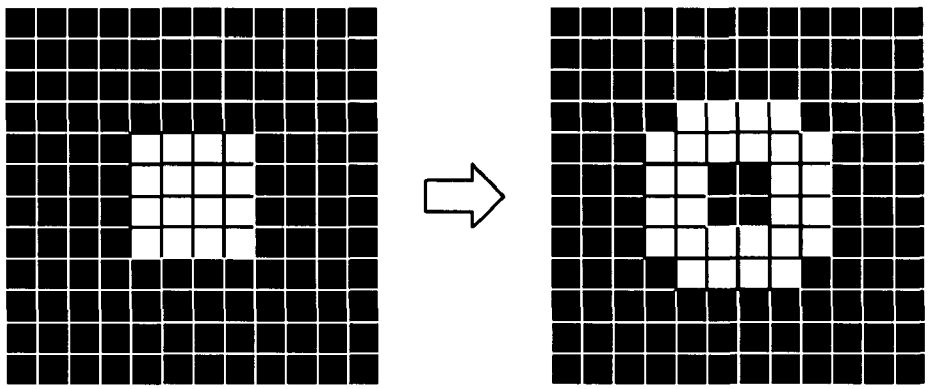
Figure 15C:
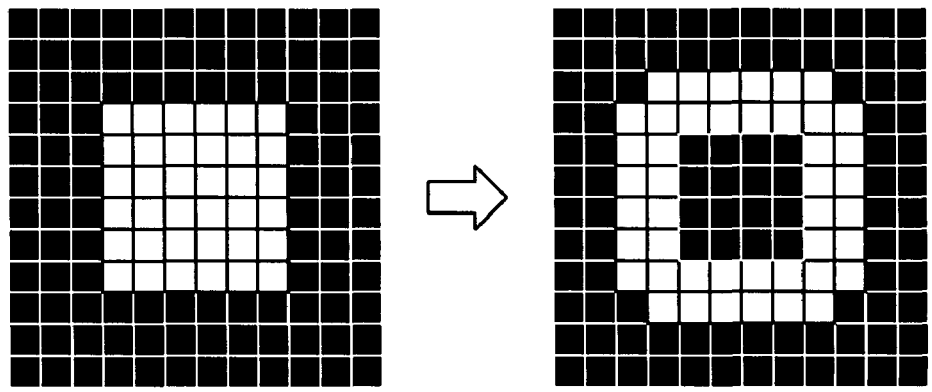

FIGS. 15A to 15C are explanatory diagrams of the relationship between the brightness image and the edge image. The grids in FIGS. 15A to 15C indicate pixels.

The images on the left side of FIGS. 15A to 15C show examples of the brightness image constituted by 12×12 pixels. In this case, for the sake of simplification of description, each piece of Y data of the brightness image is one of [0] and [255]. Pixels whose Y data is [0] are indicated in black, and pixels whose Y data is [255] are indicated in white.

The images on the right side of FIGS. 15A to 15C show examples of the edge images constituted by 12×12 pixels. In this case, pixels whose edge pixel data is [0] are indicated in black, and pixels whose edge pixel data is [1] are indicated in white.

By comparing the brightness images and edge images in FIGS. 15A to 15C, it is understood that pixels that are adjacent to the boundary between the white pixel and the black pixel in the brightness image (that is, pixels that have a large brightness difference with respect to the pixels adjacent thereto) are white pixels in the edge image. In other words, pixels that constitute the contour of the object image in the brightness image are white pixels in the edge image. For this reason, pixels whose edge pixel data is [1] (white pixels in the edge image) are also referred to as the "edge pixel".

For example, when a thin line (object image) having a width corresponding to one pixel is present in the brightness image (see the figure on the left side of FIG. 15A), two lines that sandwich the thin line appear in the edge image (see the figure on the right side of FIG. 15A). Also, when a block image (object image) is present in the brightness image (see the figures on the left side of FIGS. 15B and 15C), ring-shaped images appear in the edge images (see the figures on the right side of FIGS. 15B and 15C).

In this manner, by performing the edge tracking process on the brightness image, the edge image showing the contour of the object image of the brightness image is obtained. In other words, when the edge tracking process is performed on the brightness image data, the edge image data can be obtained.

Figure 16:
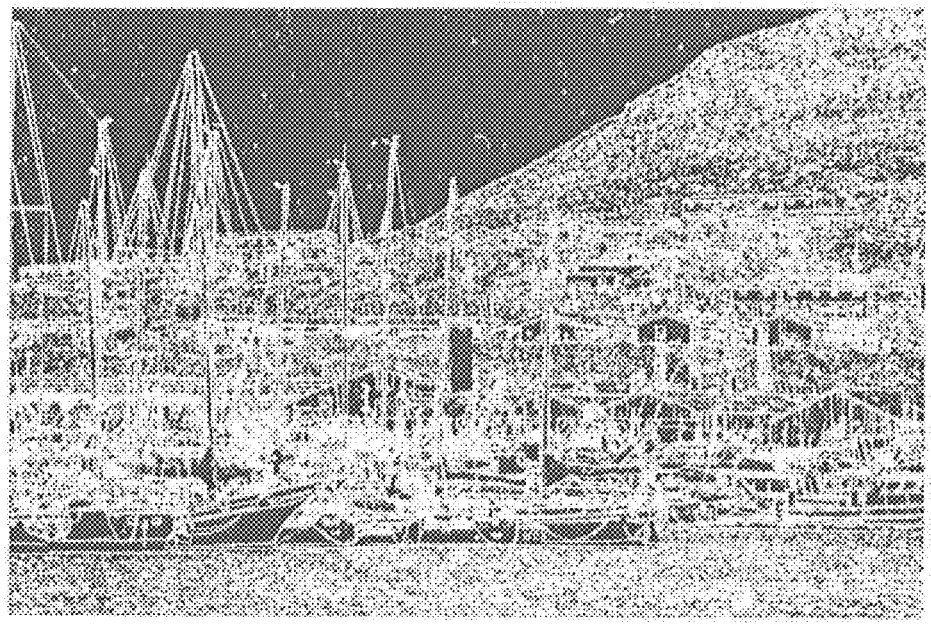
FIG. 16 is an edge image of the image shown in FIG. 10.

FIG. 16 is an edge image of the image shown in FIG. 10.

Since few contours of the target objects are present in the uniform region, the gradient intensity of each pixel is low, and therefore, many black pixels whose edge pixel data is [0] are present. As a result, in the uniform region, black images predominate in the edge image.

Since many contours of the target objects are present in the non-uniform region, many white pixels whose edge pixel data is [1] are present. As a result, in the non-uniform region, the edge image is an image in which white and black images are coexistent.

In the region including the masts or stays (wire ropes) of the yachts, linear images appear due to the edge tracking process. However, the object images of the masts or stays of the yachts in the original image are thin lines, which easily fade. Therefore, the linear images that have appeared due to the edge tracking process are discontinued in some points.

If a dust image is present in the image of FIG. 10, pixels corresponding to the contour of the dust image become the edge pixels as a result of the color conversion process (S101) and the edge tracking process (S102). Therefore, when a dust image is present in the uniform region, a white image appears in the black image, and the white image indicating the contour of the dust image appears in isolation. On the other hand, when a dust image is present in the non-uniform image, the white image indicating the contour of the dust image appears in the image in which white and black images are coexistent.

Expansion Process (S103)

In an expansion process, the computer 3 expands the region of white pixels in the edge image (pixels whose pixel data is [1]) by a predetermined number of pixels. In other words, in the expansion process, the computer 3 expands the image (white image) indicated by white pixels in the edge image.

Specifically, when pixel data (edge pixel data) of any of n×n pixels (this area is referred to as the "neighborhood area") surrounding a pixel of interest is [1], the computer 3 sets the pixel data of the pixel of interest to [1]. In other words, if the neighborhood area of a pixel of interest contains even one edge pixel, the computer 3 sets the pixel data of the pixel of interest to [1].

Figure 17A:
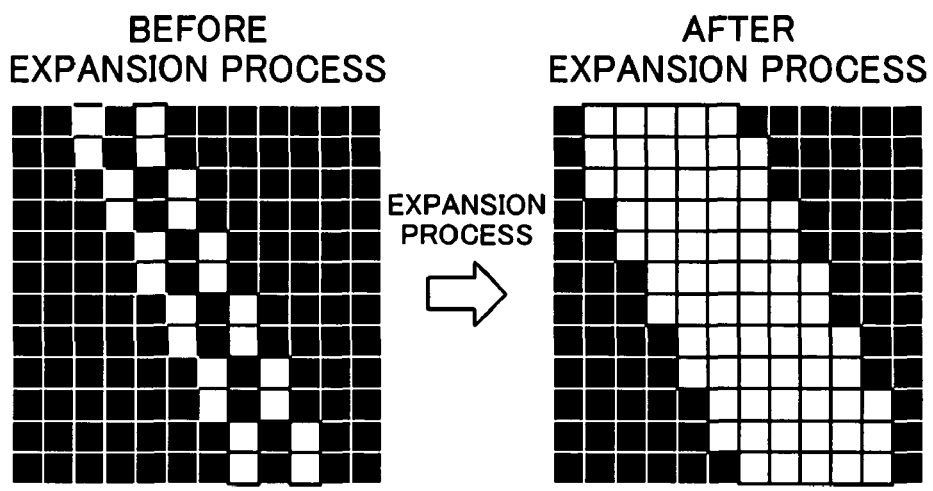
FIGS. 17A to 17C are explanatory diagrams of relationship between an image before an expansion process and an image after the expansion process.
Figure 17B:
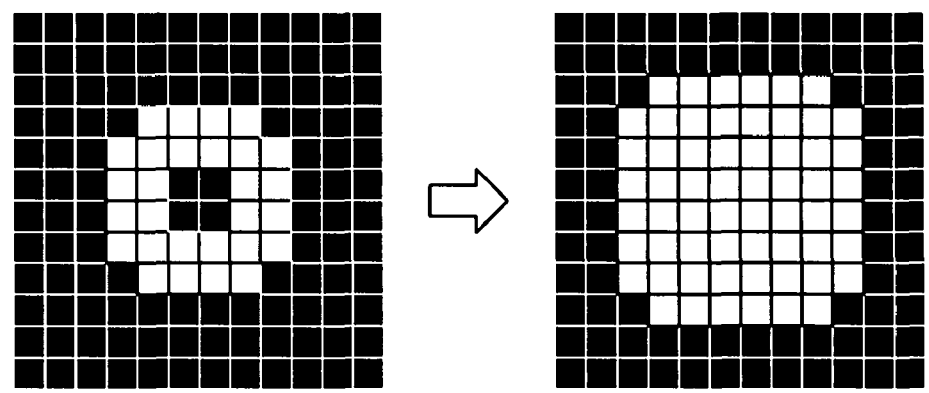
Figure 17C:
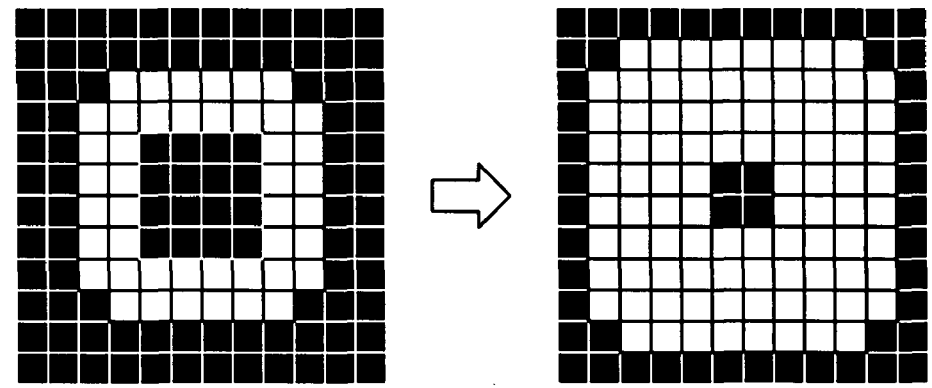

FIGS. 17A to 17C are explanatory diagrams of relationship between an image before the expansion process and an image after the expansion process. The images on the left side of FIGS. 17A to 17C show images before the expansion process. The images on the right side of FIGS. 17A to 17C show images after the expansion process. In this case, for the sake of simplification of description, the neighborhood area is constituted by 3×3 pixels.

For example, when two white lines located close to each other are present in the edge image (see the figure on the left side of FIG. 17A), a thick white line image having a width corresponding to five pixels appears as a result of the expansion process (see the figure on the right side of FIG. 17A). When a ring-shaped white image with a small center hole is present in the edge image (see the figure on the left side of FIG. 17B), a white block image with the hole filled appears as a result of the expansion process (see the figure on the right side of FIG. 17B). On the other hand, when a ring-shaped white image with a large center hole is present in the edge image (see the figure on the left side of FIG. 17C), a thick ring-shaped white image with a small center hole appear as a result of the expansion process (see the figure on the right side of FIG. 17C).

In this manner, the outer contour of the white image expands as a result of the expansion process. Furthermore, due to the expansion process, in addition to expansion of the white image, white pixels or white images located distant from each other may be merged, or a small hole may be filled. A white image that has a narrow recess before the expansion process results in a white image with such a recess filled as a result of the expansion process.

Although the neighborhood area in this case is constituted by 3×3 pixels for the sake of simplification of description, in practice, the neighborhood area is constituted by 7×7 pixels. Therefore, compared with FIGS. 17A to 17C, the white images in actuality expand to a larger extent, and a hole having a similar size to that in FIG. 17C is filled as a result of the expansion process.

Erosion Process (S104)

In an erosion process, the computer 3 shrinks the region of white pixels (pixels whose pixel data is [1]) by a predetermined number of pixels. In other words, in the erosion process, the computer 3 shrinks the white image obtained as a result of the expansion process.

Specifically, when pixel data of any pixel in the neighborhood area of a pixel of interest is [0], the computer 3 sets the pixel data of the pixel of interest to [0]. In other words, if the neighborhood area of the pixel of interest contains even one non-edge pixel, the computer 3 sets the pixel data of the pixel of interest to [0].

The neighborhood area in the erosion process is the same as the neighborhood area in the above-described expansion process. That is, if the neighborhood area in the expansion process is constituted by 3×3 pixels, that in the erosion process is also constituted by 3×3 pixels, and if the neighborhood area in the expansion process is constituted by 7×7 pixels, that in the erosion process is also constituted by 7×7 pixels.

Figure 18A:
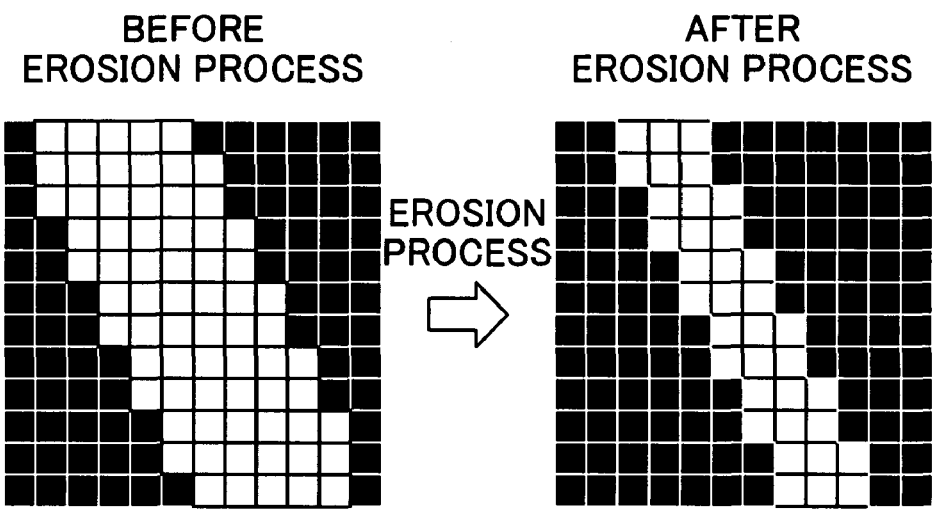
FIGS. 18A to 18C are explanatory diagrams of relationship between an image before an erosion process and an image after the erosion process.
Figure 18B:
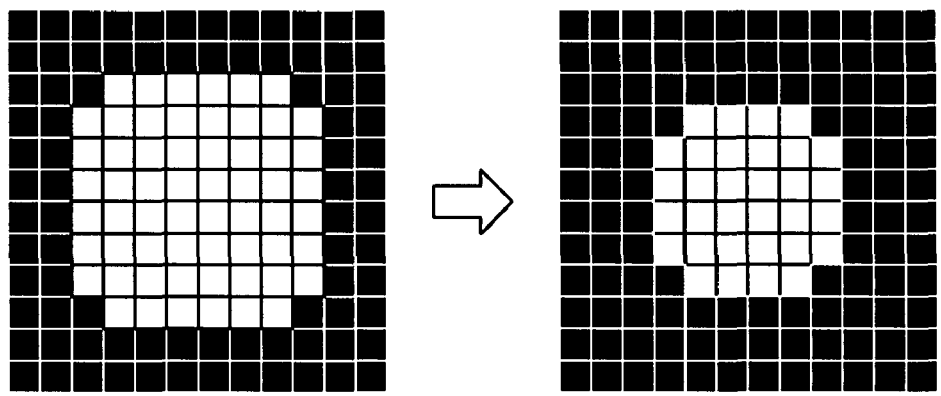
Figure 18C:
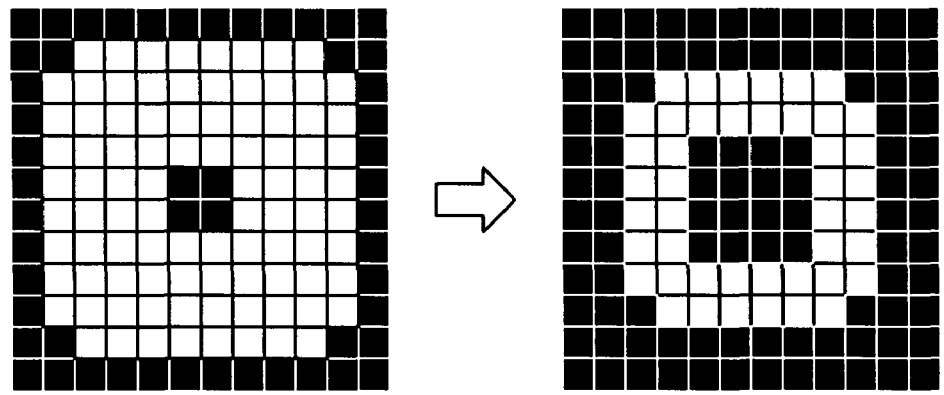

FIGS. 18A to 18C are explanatory diagrams of relationship between an image before the erosion process and an image after the erosion process. The images on the left side of FIGS. 18A to 18C show images before the erosion process, and the images on the right side of FIGS. 18A to 18C show images after the erosion process. In this case, similarly to the expansion process shown in FIGS. 17A to 17C, the neighborhood area is constituted by 3×3 pixels.

For example, when a thick white line is present in the image before the erosion process (see the figure on the left side of FIG. 18A), a thin white line image appears as a result of the erosion process (see the figure on the right side of FIG. 18A). When a white block image is present in the image before the erosion process, a small white block image appears as a result of the erosion process. On the other hand, when a white image before the erosion process has a hole, the hole expands as a result of the erosion process.

In this manner, the outer contour of the white image shrinks as a result of the erosion process.

Figure 19A:
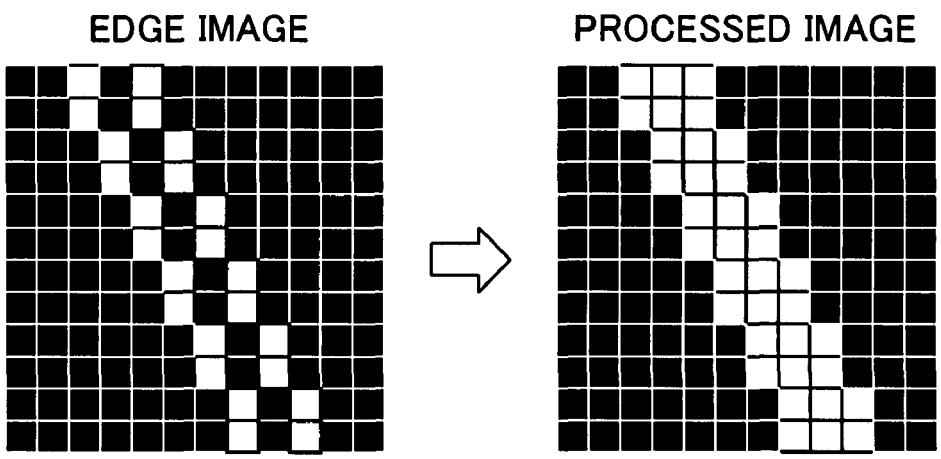
FIGS. 19A to 19C are explanatory diagrams of relationship between the edge image and the image after the erosion process.
Figure 19B:
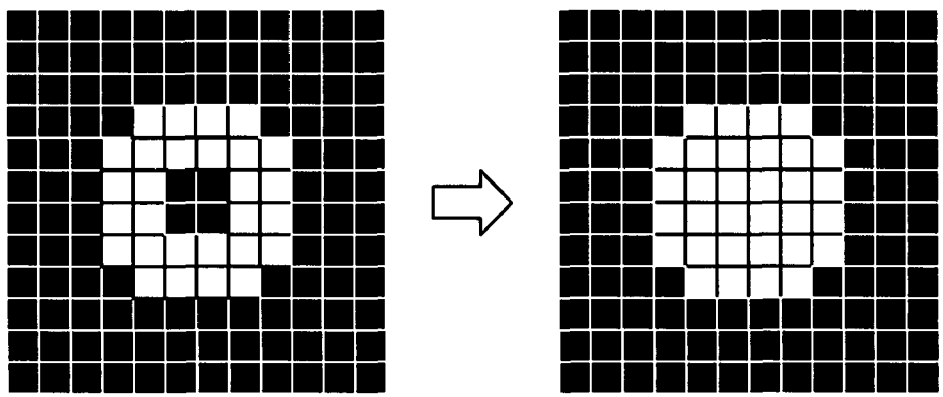
Figure 19C:
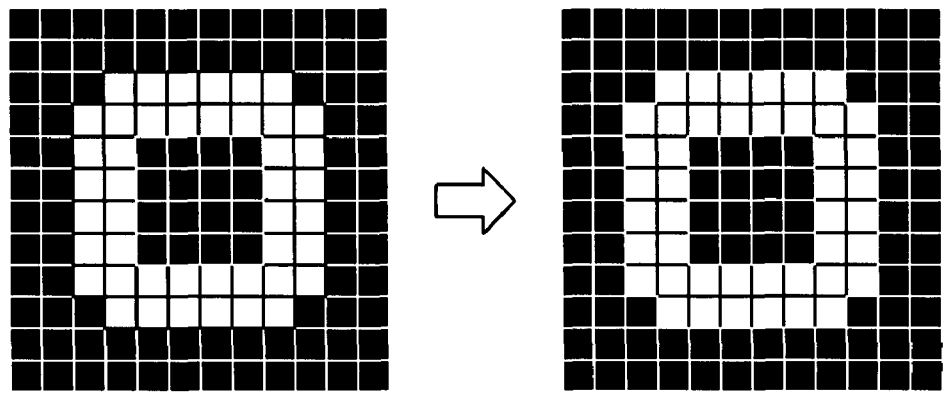

FIGS. 19A to 19C are explanatory diagrams of relationship between the edge image and the image after the erosion process. The images on the left side of FIGS. 19A to 19C show the edge images. The images on the right side of FIGS. 19A to 19C show the images after the erosion process. That is, the images on the right side of FIGS. 19A to 19C are images obtained after performing the expansion process and erosion process on the images on the left side of FIGS. 19A to 19C.

When two white lines located close to each other are present in the edge image (see the figure on the left side of FIG. 19A), as a result of performing the erosion process after the expansion process, the space between the two white lines is filled, and an image of one white line appears (see the figure on the right side of FIG. 19A). When a ring-shaped white image is present in the edge image (see the figures on the left side of FIGS. 19B and 19C), if the image has a small hole, the hole is filled as a result of performing the erosion process after the expansion process (see the figure on the right side of FIG. 19B), and if the image has a large hole, the hold is not filled even as a result of performing the erosion process after the expansion process (see the figure on the right side of FIG. 19C).

As described above, even if the erosion process is performed after the expansion process, the outer contour of the white image does not change. However, if an image before these processes has a small hole or recess, such a hole or recess can be filled by performing the erosion process after the expansion process. In addition, when white pixels/white images are present at small intervals in the edge image before these processes, such white pixels/white images are joined to each other by performing the erosion process after the expansion process.

Figure 20A:
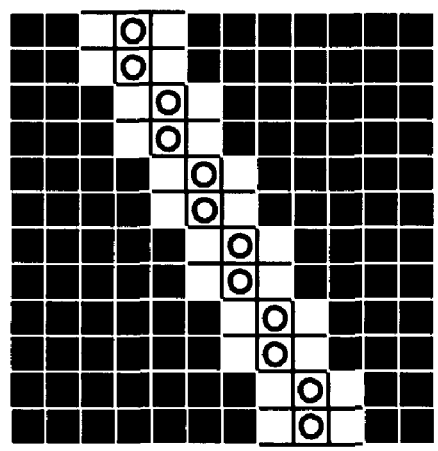
FIGS. 20A to 20C are explanatory diagrams of relationship between the image after the erosion process and the brightness image.
Figure 20B:
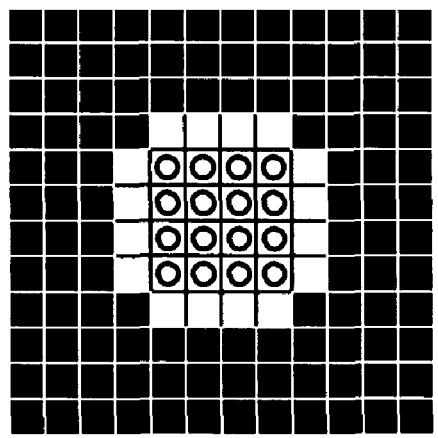
Figure 20C:
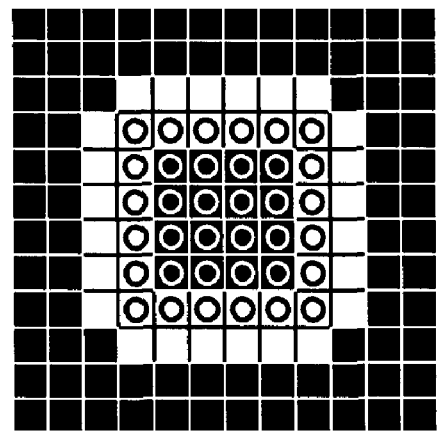

FIGS. 20A to 20C are explanatory diagrams of relationship between the image after the erosion process and the brightness image. Pixels whose pixel data after the erosion process is [0] are indicated in black, and pixels whose pixel data after the erosion process is [1] are indicated in white. A circle is assigned to white pixels that constitute the object image in the brightness image.

When a line or a small block image (object image) is present in the brightness image (see FIGS. 20A and 20B), the object image of the brightness image is included in the white image region after the erosion process. In other words, if the size of the white image after the erosion process is equal to or smaller than a predetermined size, the region of the object image in the brightness image is included in that white image region. That is, if the size of the white image region after the erosion process is equal to or smaller than a predetermined size, that white image region shows the position of the object image in the brightness image. However, when the size of the object image in the brightness image is larger than the predetermined size (see FIG. 20C), the white image region after the erosion process does not necessarily show the position of the object image in the brightness image.

It should be noted that the image obtained as a result of performing the expansion process and then the erosion process on the edge image is referred to as the "processed image". The image data representing the processed image is referred to as the "processed image data".

Figure 21:
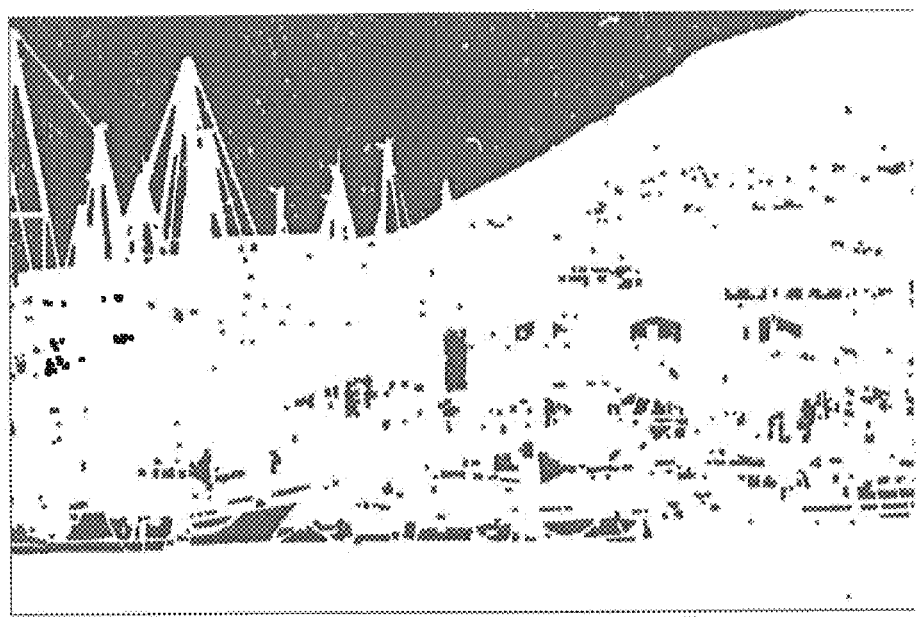
FIG. 21 is a processed image obtained as a result of performing the expansion process and then the erosion process on the edge image of FIG. 16.

FIG. 21 is a processed image obtained as a result of performing the expansion process and then the erosion process on the edge image of FIG. 16. Although the neighborhood area in the expansion process and the erosion process used in the above description is constituted by 3×3 pixels, here the neighborhood area is constituted by 7×7 pixels.

The uniform region in the edge image is predominated by black images. Therefore, the uniform region of the processed image is also predominated by black images. When the white images indicating the contours of dust are present in the uniform region of the edge image, those white images exist sparsely. Consequently, in the uniform region of the processed image, it is rare that the white pixels indicating the contours of dust are joined to each other, and therefore such white images exist sparsely.

In the non-uniform region of the edge image, white images are present close to each other. Therefore, most of such white pixels are joined to each other in the non-uniform region of the processed image. As a result, the size of the white image region is larger than a predetermined size in the non-uniform region. Even if dust images are present in the non-uniform region in the original image, as a result of the expansion process and the erosion process on the edge image, white pixels indicating the contours of dust and white pixels indicating the contours of the target objects in the non-uniform region are joined to each other and merged.

Also, although the linear white images of the masts or stays (wire ropes) of the yachts are discontinued in some points in the edge image, in the processed image, such discontinued lines become continuous lines as a result of performing the erosion process after the expansion process. Consequently, the size of regions of such linear white images after the erosion process is also larger than a predetermined size.

In short, it is possible to consider that the white image in the processed image whose size is equal to or smaller than a predetermined size is related to the dust image. Furthermore, it is possible to consider that the positions of white images in the processed image whose size is equal to or smaller than a predetermined size show the positions of dust images in the uniform region in the original image.

Incidentally, the computer 3 changes the size of the neighborhood area in the expansion process and erosion process depending on the reading resolution of the original. For example, in the foregoing description, the resolution is set to "4,800 dpi" and the neighborhood area is constituted by 7×7 pixels. On the other hand, when the resolution is set to a low value "2,400 dpi", the computer 3 makes the neighborhood area smaller, such as the area of 5×5 pixels. This is because when the reading resolution is set to a low value, the interval between pixels indicating the contours of the target objects in the original image becomes narrow, and white pixels are joined to each other to a sufficient extent even if the neighborhood area in the expansion process or the erosion process is small. On the contrary, when the reading resolution is set to a high value, the interval between pixels indicating the contours of the target objects in the original image becomes long, and white pixels are not joined to each other to a sufficient extent unless the neighborhood area in the expansion process and erosion process is large enough.

Labeling Process (S105)

In a labeling process, the computer 3 performs grouping of white pixels by assigning a label to each white pixel. In other words, in the labeling process, the computer 3 assigns a label to each white image so as to make it possible to process respective white images separately.

Figure 22:
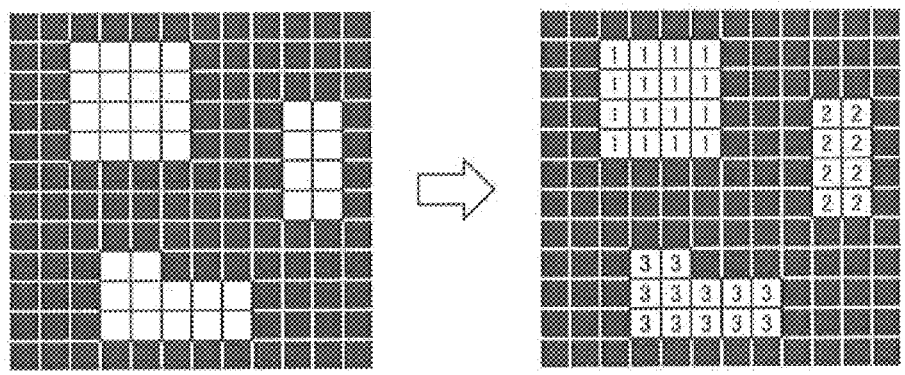
FIG. 22 is an explanatory diagram of a labeling process.

FIG. 22 is an explanatory diagram of the labeling process. The image on the left side of FIG. 22 shows a processed image, and the image on the right side of FIG. 22 shows a resultant image after the labeling process. In the image on the right side of FIG. 22, numbers indicated in the respective white pixels indicate the labels assigned thereto.

In the labeling process, the computer 3 assigns a label (number) to each white pixel as an attribute, and performs grouping of the white pixels by assigning the same label to white pixels connected to each other. Specifically, the computer 3 initially searches for a white pixel that does not have a label. Then, when any white pixel without a label is found, the computer 3 assigns a new label to that pixel. Then, the computer 3 assigns the same label to white pixels that are connected to that found pixel in four directions. Further, the same label is assigned also to white pixels that are connected in four directions to any of those white pixels to which the same label has been assigned. Such a process to assign the same label is repeated, until there remains no white pixel to assign the same label. Then, the computer 3 searches for other white pixel without a label, and when it finds a white pixel without a label, it assigns a new label to that pixel, and performs a similar process again.

Isolation Point Extraction Process (S106)

In an isolation point extraction process, the computer 3 extracts as the isolation point the white pixel region whose size is equal to or smaller than a predetermined size.

Figure 23:
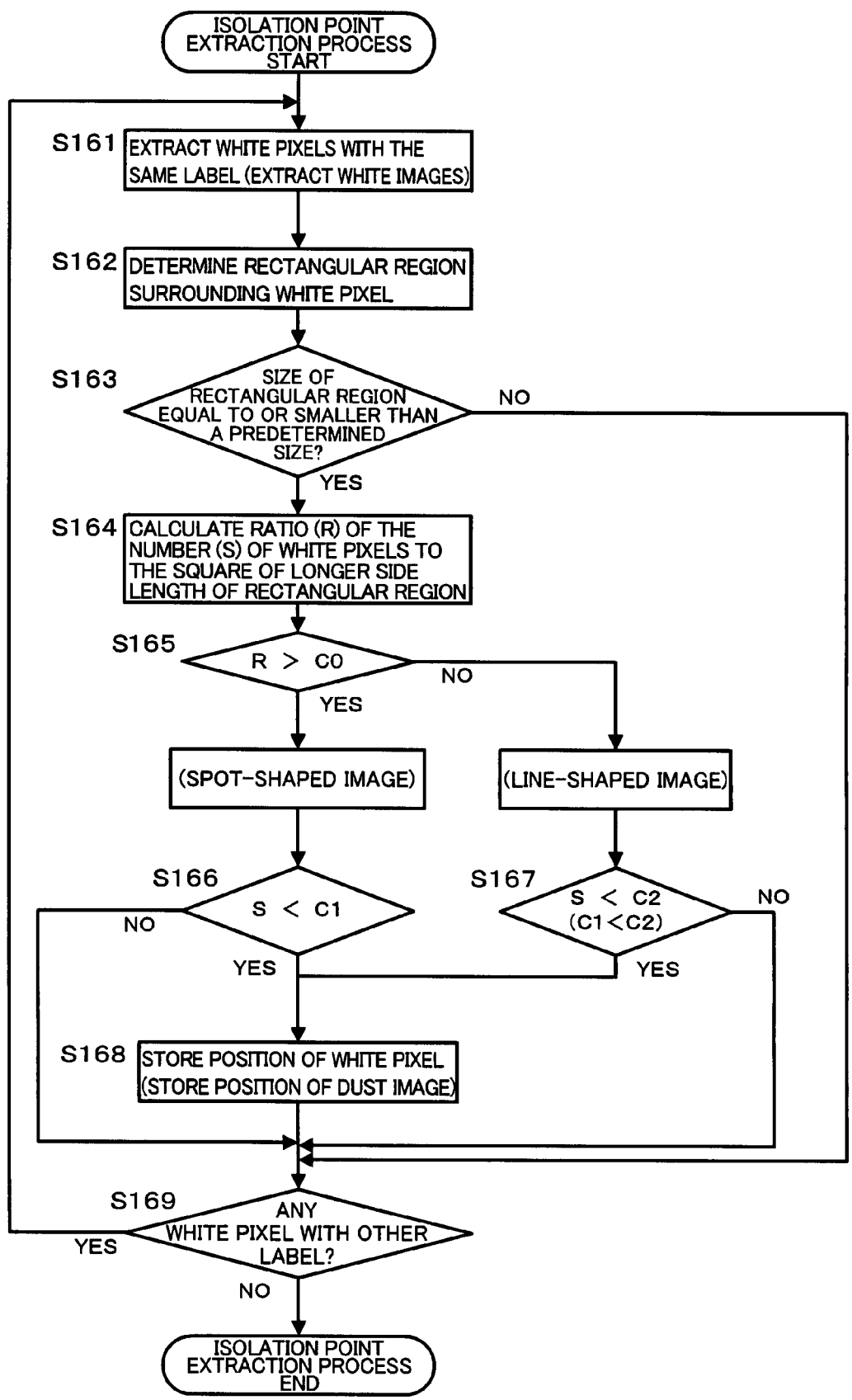
FIG. 23 is a flowchart for extracting an isolation point.
Figure 24:
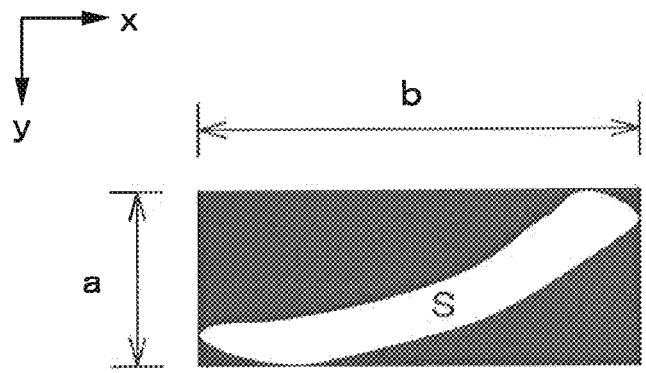
FIG. 24 is an explanatory diagram of a white pixel and a rectangular region surrounding the white pixel.

FIG. 23 is a flowchart for extracting an isolation point. FIG. 24 is the explanatory diagram of a white pixel and a rectangular region surrounding that white pixel.

Initially, the computer 3 first extracts all white pixels assigned with the same label (S161). Then, the computer 3 determines a rectangular region surrounding the corresponding white image (S162). Specifically, of all the white pixels extracted in S161, maximum and minimum values of the position in the x direction and maximum and minimum values of the position in the y direction are obtained, and the rectangular region is determined based on these values.

Next, the computer 3 determines whether or not the size of the rectangular region is equal to or smaller than a predetermined size (S163). When the size of the rectangular region is equal to or smaller than the predetermined size, the white image extracted in S161 may relate to the dust image, and therefore processes in S164 onward are performed. When the size of the rectangular region is larger than the predetermined size, the white image extracted in S161 can be considered to be unrelated to the dust image. For example, in FIG. 21, determination by the computer 3 in S163 is "YES" with respect to the white images sparsely present in the uniform region. In contrast, in FIG. 21, determination by the computer 3 in S163 is "NO" with respect to the white images present in the non-uniform region.

When the size of the rectangular region is equal to or smaller than the predetermined size ("YES" in S163), the computer 3 calculates a ratio (R=S/(b×b)) of the number (S) of white pixels to the square of the longer side length (in this case, b) of the rectangular region (S164). In other words, the ratio of the number of white pixels to the area of the square whose side length is equal to the longer side length of the rectangular region is calculated. When the white image is spot-shaped, the ratio R tends to be a large value. On the other hand, when the white image is line-shaped, the ratio R tends to be small value. It should be noted that when the dust image is spot-shaped, the ratio R tends to be a large value, and when the dust image is line-shaped, the ratio R tends to be a small value.

The process in S164 is for distinguishing the shape (spot-shaped/line-shaped) of the white image. Therefore, it is not necessarily required to use the square of the longer side length of the rectangular region in calculating the ratio R, so long as such distinction is possible. However, when the shape of the white image is determined simply based on the ratio (S/(a×b)) of the number (S) of white pixels to the area (a×b) of the rectangular region, erroneous determination becomes likely when a linear white image lies along the x direction or y direction.

Next, the computer 3 compares the ratio R with a threshold value C0 (S165). The threshold value C0 is a preset value.

The white image is considered to be spot-shaped if the ratio R is larger than the threshold value C0 ("YES" in S165). The white image is considered to be line-shaped if the ratio R is equal to or smaller than the threshold value C0 ("NO" in S165).

When the white image is spot-shaped, namely, the ratio R is larger than the threshold value C0 ("YES" in S165), the computer 3 compares the number S of white pixels with a threshold value C1 (S166). The threshold value C1 is also a preset value. When the number S of white pixels is smaller than the threshold value C1 ("YES" in S166), the white image is considered to be related to the dust image. On the other hand, when the number S of white pixels is equal to or larger than the threshold value C1 ("No" in S166), the white image is bigger than the dust image, and therefore considered to be related to the target object.

When the white image is line-shaped, namely, the ratio R is equal to or smaller than the threshold value C0 ("NO" in S165), the computer 3 compares the number S of white pixels with a threshold value C2 (S167). The threshold value C2 is also a preset value. When the number S of white pixels is smaller than the threshold value C2 ("YES" in S167), the white image is considered to be related to the dust image. On the other hand, when the number S of white pixels is equal to or larger than the threshold value C2 ("No" in S167), the white image is bigger than the dust image, and therefore considered to be related to the target object.

When the white image is related to the dust image, namely, when determination in S166 or S167 is "YES", the computer 3 stores the positions of the white pixels extracted in S161 (S168). The positions indicate the position of the dust image in the original image.

After the process in S168, when determination in S166 or S167 is "NO", or when determination in S163 is "NO", the computer 3 terminates the process on the white pixels extracted in S161, and determines whether or not there are any white pixels assigned with other label (S169). If there are white pixels assigned with other label ("YES" in S169), the computer 3 performs the processes in S161 to S168 on the white pixels assigned with that other label in a similar manner. If there is no white pixel assigned with other label ("NO" in S169), the isolation point extraction process (S106 in FIG. 12) is terminated.

Through this isolation point extraction process (S106), the computer 3 can obtain the positions in the processed image of the white images related to the dust images. Furthermore, the position in the processed image of the isolation points (white images related to dust images) correspond to the positions of the dust images in the original image (see FIGS. 20A and 20B).

Figure 25:
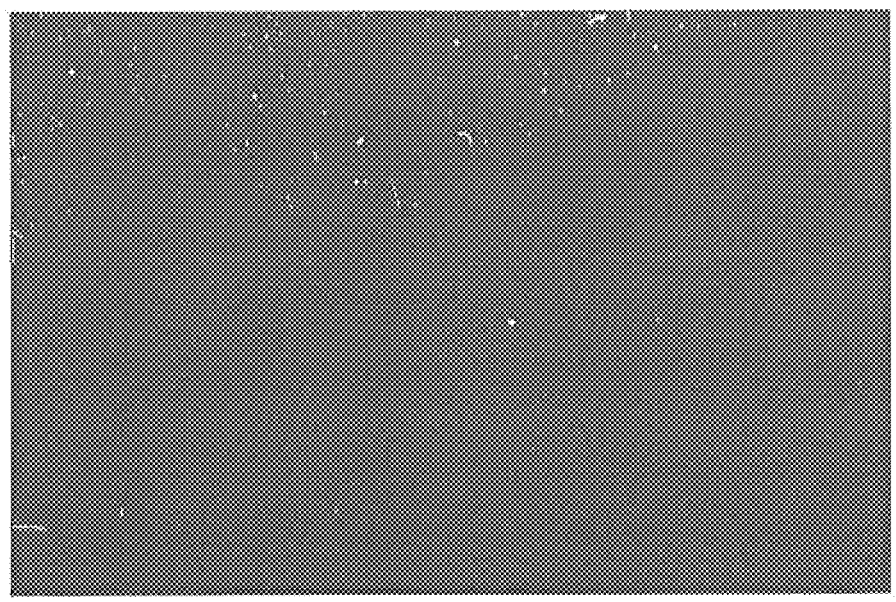
FIG. 25 shows an image obtained by extracting isolation points from the processed image of FIG. 21.

FIG. 25 shows an image obtained by extracting the isolation points from the processed image of FIG. 21. The positions in FIG. 25 correspond to the positions of the dust images in the original image. That is, the dust images are present on the positions in the original image that correspond to the positions of the white images in FIG. 25.

Incidentally, in the present embodiment, the threshold value C1 in S166 and the threshold value C2 in S167 are set to different values, and the threshold value C2 is larger than the threshold value C1. Specifically, in the present embodiment, the computer 3 changes the method for determining whether or not a certain white image is related to the dust image, depending on the shape of that white image (spot-shaped/line-shaped). The reason for this is described below.

Figure 26:
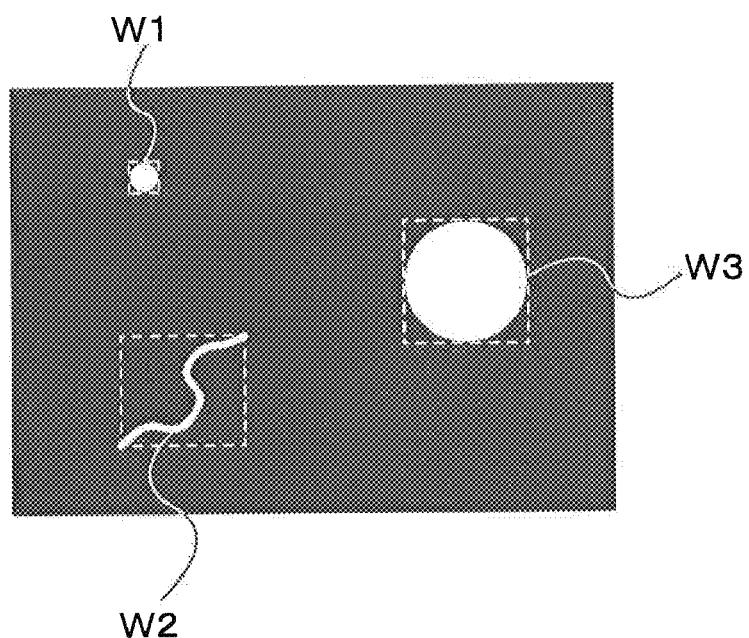
FIG. 26 is an explanatory diagram of white images extracted in S161.

FIG. 26 is an explanatory diagram of the white images extracted in S161. A first white image W1 is a comparatively small spot-shaped image. A second white image W2 is a linear image. A third white image W3 is a comparatively large spot-shaped image. Dotted lines forming rectangles in FIG. 26 are for indicating the rectangular regions that surround the white images, and are not white images.

When a spot-shaped dust image is present in the original image, a comparatively small spot-shaped image such as the first white image W1 appears in the processed image. When a linear dust image is present in the original image, a linear image such as the second white image W2 appears in the processed image. On the other hand, when an image of the target object is present in the uniform region of the original image, a comparatively large spot-shaped image such as the third white image W3 appears in the processed image.

In short, a comparatively small spot-shaped image such as the first white image W1 relates to the dust image, and a linear image such as the second white image W2 also relates to the dust image. However, the third white image W3 is not related to the dust image, although there is no significant difference in size between the rectangular region surrounding the third white image W3 and that surrounding the second white image W2.

When an attempt is made to determine whether or not a certain white image relates to the dust image based on the size of the rectangular region only, without taking into account the shape of that white image (for example, the process proceeds to S168 when "YES" in S163), if the second white image W2 is determined to be related to the dust image, even the third white image W3 is determined to be related to the dust image as well. On the contrary, if the third white image W3 is determined to be unrelated to the dust image, even the second white image W2 is determined to be unrelated to the dust image. In short, if determination is made as to whether or not a certain white image is related to the dust image based on only the size of the rectangular region without taking into account the shape of the white image, erroneous detection may frequently occur.

In view of the above, in the present embodiment, the computer 3 determines the shape of the white image in S164 and S165, and changes the threshold values depending on the obtained shape of the white image, thereby changing the method for determining whether or not the white image is related to the dust image depending on the shape (spot-shaped/line-shaped) of the white image. As a result, the computer 3 can determine that the second white image W2 relates to the dust image, and also that the third white image W3 is not related to the dust image.

Figure 27:
FIG. 27 is an explanatory diagram of positions of dust images detected by the dust detection process of the present embodiment.
Figure 28A:
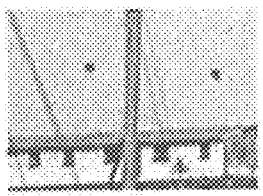
FIG. 28A is an enlarged image of the region indicated in FIG. 27.

FIG. 27 is an explanatory diagram of the positions of the dust images detected by the dust detection process of the present embodiment. FIG. 28A is an enlarged image of the region indicated in FIG. 27. There is an image of a mast in the central area of FIG. 28A. Also there is an image of a building in a lower portion of FIG. 28A. An image of a stay (wire rope) extends obliquely downward from the upper left corner in FIG. 28. In addition, two spot-shaped dust images are present on the right and left sides of the mast image.

Dust Removal Process

The dust removal process is a process for removing the dust image in the original image based on the results of the dust detection process. In other words, it is a process for converting pixel data constituting the dust image in the original image to other pixel data.

Blurring Process

A blurring process is known as a process for removing defective images such as dust images. It is possible with the blurring process to make defective images less noticeable by blurring defective images.

However, in the blurring process, the blurring effect thereof extends to even images other than defective images. That is, the blurring process damages the images of the target objects.

Figure 28B:
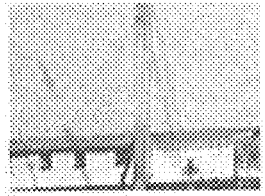
FIG. 28B is an image obtained as a result of performing a blurring process on the dust image of FIG. 28A.

FIG. 28B is an image obtained as a result of performing the blurring process on the dust images of FIG. 28A. The dust images have become less noticeable due to the effects of the blurring process. However, the mast image in the central area becomes faint, and the stay image extending obliquely downward from the upper left corner is discontinued in some points, and the window images of the building on the lower right portion have become faint.

Median Filter

A median filtering process can be used in order to remove dust images. In the median filtering process, the computer 3 sets the median value of pixel data of the area constituted by n×n pixels (neighborhood area) surrounding a pixel of interest as the pixel data of the pixel of interest. This process is described below.

Figure 29:
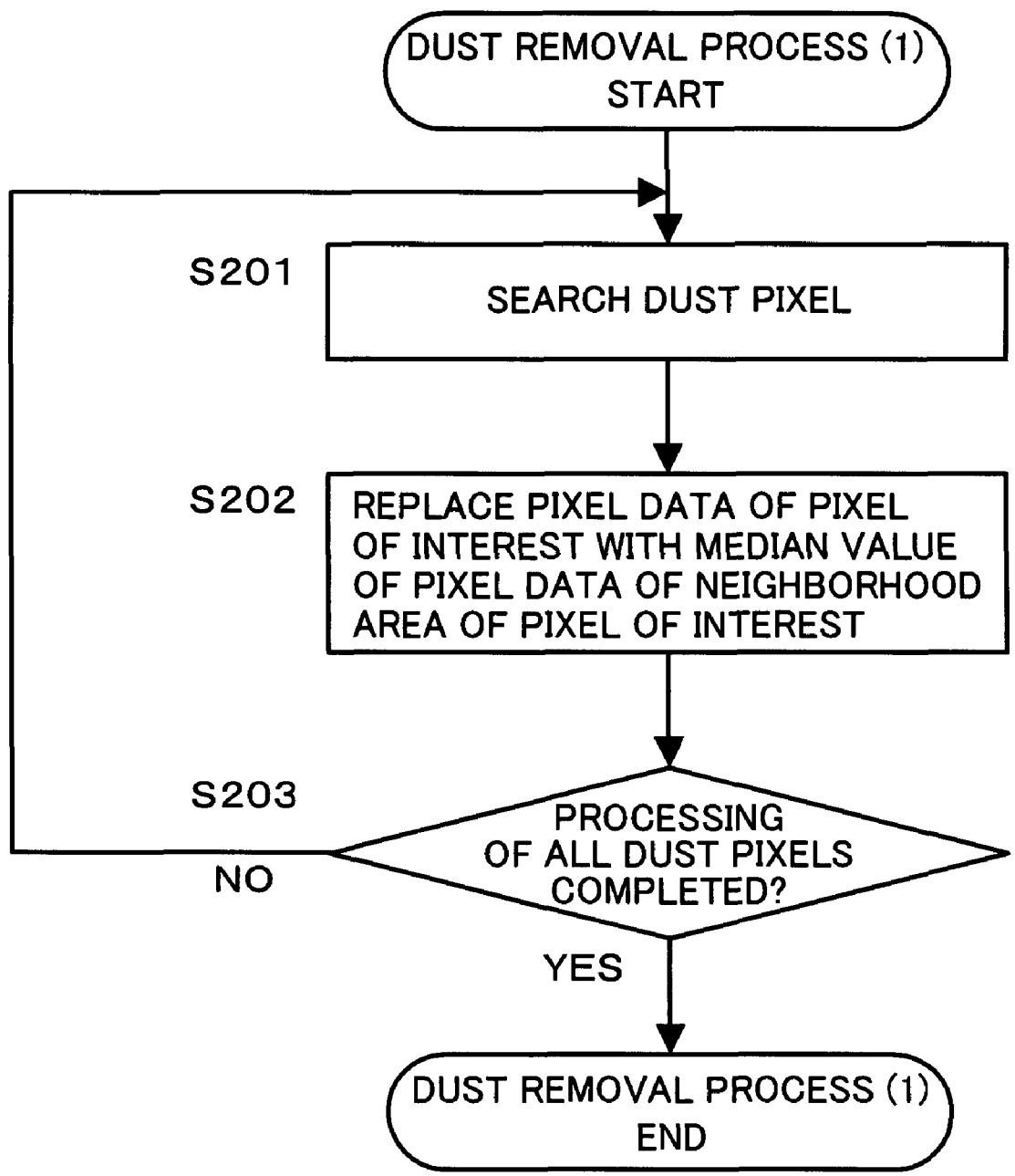
FIG. 29 is a flowchart of the dust removal process using a median filtering process.

FIG. 29 is a flowchart of the dust removal process using the median filtering process. The dust removal process is performed by the scanner driver causing the computer 3 to perform image processing after the dust detection process. That is, the scanner driver includes a program code for causing the computer 3 to perform various processes in FIG. 29.

Figures 30, 31:
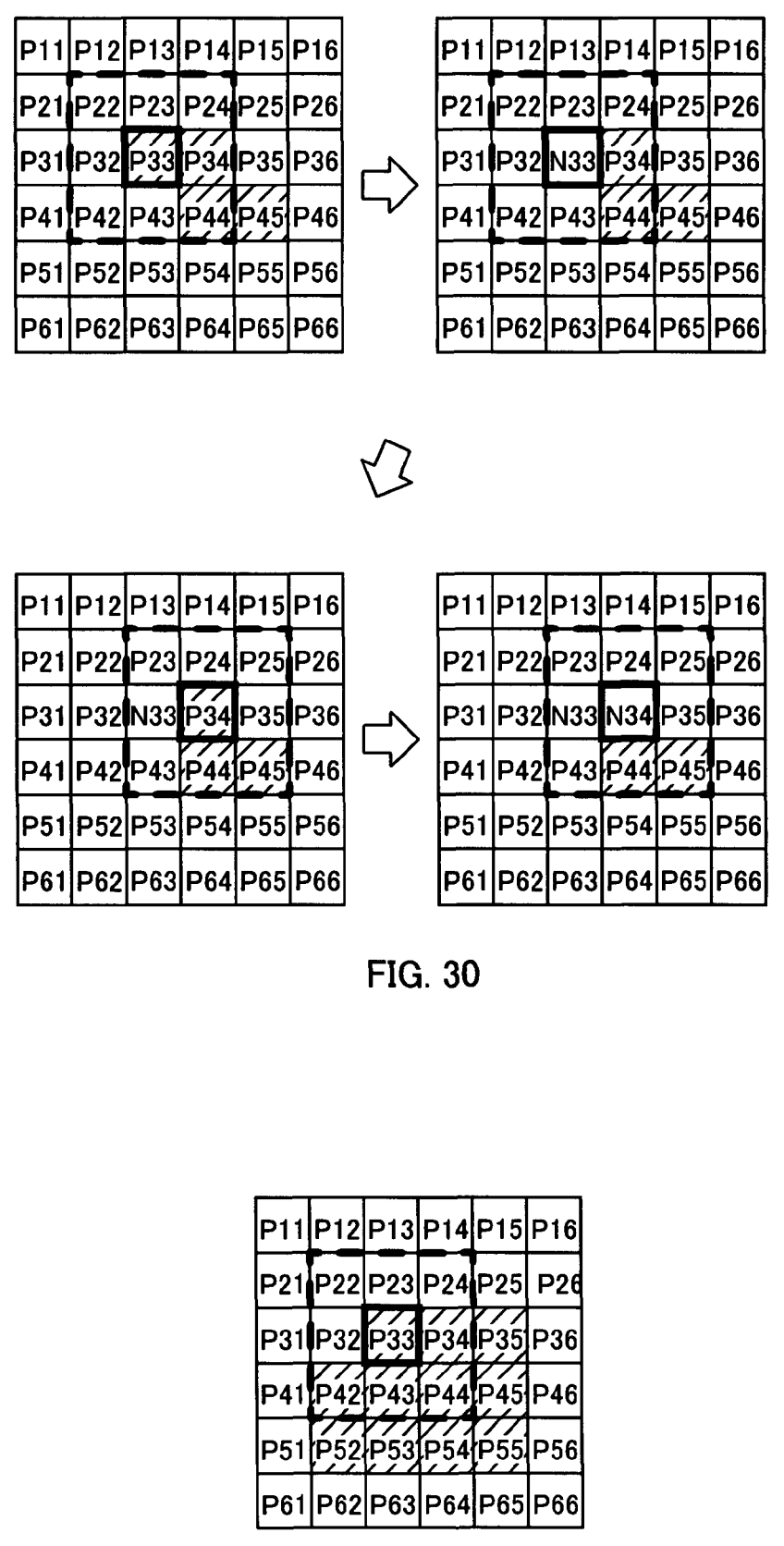

FIG. 30 is an explanatory diagram of the dust removal process using the median filter. The grids in FIG. 30 indicate pixels, and the grids hatched with diagonal lines indicate pixels determined to be the dust image. In each grid indicating a pixel, pixel data corresponding thereto is indicated. In this case, because of space limitations, pixel data of a pixel (j, i) is indicated as "Pji". In FIG. 30, the pixel of interest is shown with a thick solid line, and the neighborhood area thereof is shown with a thick dashed line. In FIG. 30, for the sake of simplification of description, although the neighborhood area is set to an area constituted by 3×3 pixels surrounding the pixel of interest, in practice, the neighborhood area is an area constituted by 7×7 pixels surrounding the pixel of interest. In order to obtain the median value later, the number of pixels for constituting the neighborhood area is set to an odd number.

The computer 3 initially searches for the dust pixel (S201). The position of the dust pixel to be searched for is the position of the white pixel saved in S168 described above. Firstly, the search is performed in order from the upper left pixel to the right side, and such search from the left side to the right side is performed sequentially from the top. Specifically, the computer 3 searches for the dust pixel in the following order: pixel (1, 1), pixel (1, 2), . . . pixel (1, 6), pixel (2, 1), pixel (2, 2), . . . In this case, the pixel (3, 3) is the first pixel retrieved as the dust pixel (see the upper left figure in FIG. 30).

Next, the computer 3 replaces the pixel data of the pixel of interest with the median value of the pixel data of the neighborhood area thereof (S202). Herein the pixel (3, 3) is the pixel of interest. Therefore the computer 3 obtains the brightness data (Y data) of nine pieces of pixel data, P22, P23, P24, P32, P33, P34, P42, P43 and P44, obtains the median value of these nine pieces of brightness data, and then sets the pixel data of the pixel (3, 3) to the pixel data of the pixel that represents the median value. Since six out of nine pixels in the neighborhood area are not the dust pixel, it is highly likely that the non-dust pixel represents the median value. In other words, the pixel data of the pixel (3, 3), which is the dust pixel, is replaced with the pixel data of a non-dust pixel as a result of application of the median filter. It should be noted that the new pixel data of the pixel (3, 3) is indicated as "N33" (see the upper right figure in FIG. 30).

The computer 3 determines whether or not processing all the dust pixels is completed (S203), and if there is any unprocessed dust pixel, repeats the above-described processes in S201 and S202. In this case, since there are three unprocessed dust pixels, determination in S203 is "NO".

In S201, the pixel (3, 4) is detected as the dust pixel (see the lower left figure in FIG. 30). Since the pixel (3, 4) is the pixel of interest, the computer 3 obtains the brightness data of nine pieces of pixel data, P23, P24, P25, N33, P34, P35, P43, P44 and P45, obtains the median value of these nine pieces of brightness data, and then sets the pixel data of the pixel (3, 4) to the pixel data of the pixel that represents the median value. In this manner, when the pixel data of a pixel in the neighborhood area has been replaced with new pixel data, the median value is obtained using such new pixel data (for example, by using N33 of the pixel (3, 3)). It should be noted that the new pixel data of the pixel (3, 4) is indicated as "N34" (see the lower right figure in FIG. 30).

The computer 3 repeats these processes so as to replace the pixel data of the remaining dust pixels (4, 4) and (4, 5). Then, when processing all the dust pixels is completed ("YES" in S203), the computer 3 terminates the dust removal process.

It is known that a random filter is effective for random noise removal. Since the dust images are present in the uniform region, the dust images are similar to random noise, which is not related to the characteristics of the images around the same. For this reason, performing the dust removal process using the random filter enables the dust images to be removed effectively while suppressing damage on the surrounding images.

However, with the above-described method, it is highly likely that in the dust-removed image the dust image portion shows drastic change in image, which results in an unnatural image. Also with such a method, when the dust pixels form a large block, the pixel data of a dust pixel may be replaced with the pixel data of another dust pixel, and therefore the dust pixels may not be removed.

For example, in the case where the dust pixels form a large block, as shown in FIG. 31, when the median filter is applied to the pixel (3, 3), since five out of nine pixels in the neighborhood area are dust pixels, it is highly likely that the dust pixel represents the median value. In such a case, the new pixel data N33 may be replaced with the pixel data of the dust pixel.

Accordingly, in the present embodiment, the dust removal process described below is performed.

Dust Removal Process of the Present Embodiment

Figure 32:
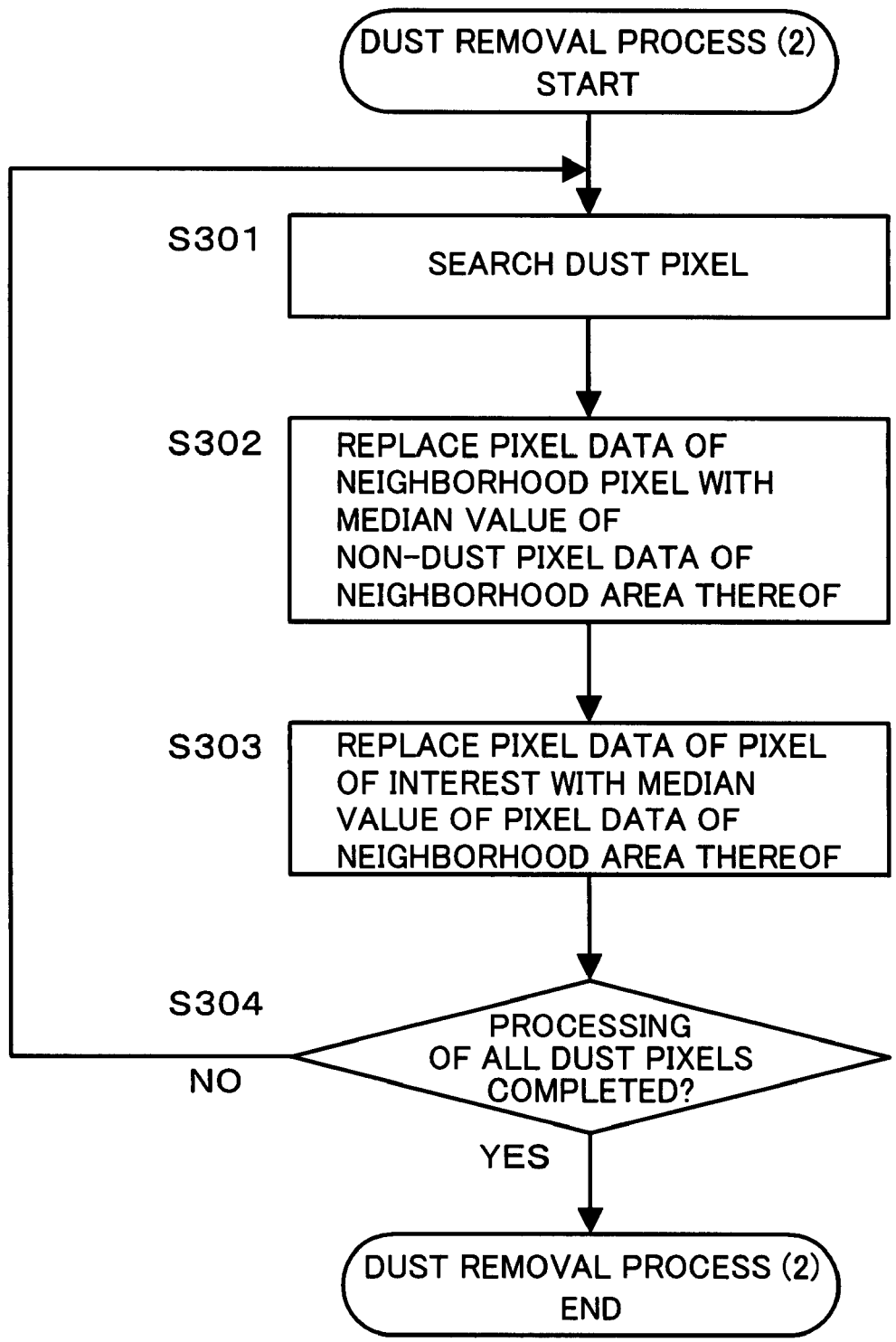
FIG. 32 is a flowchart of the dust removal process of the present embodiment.
Figure 33A:
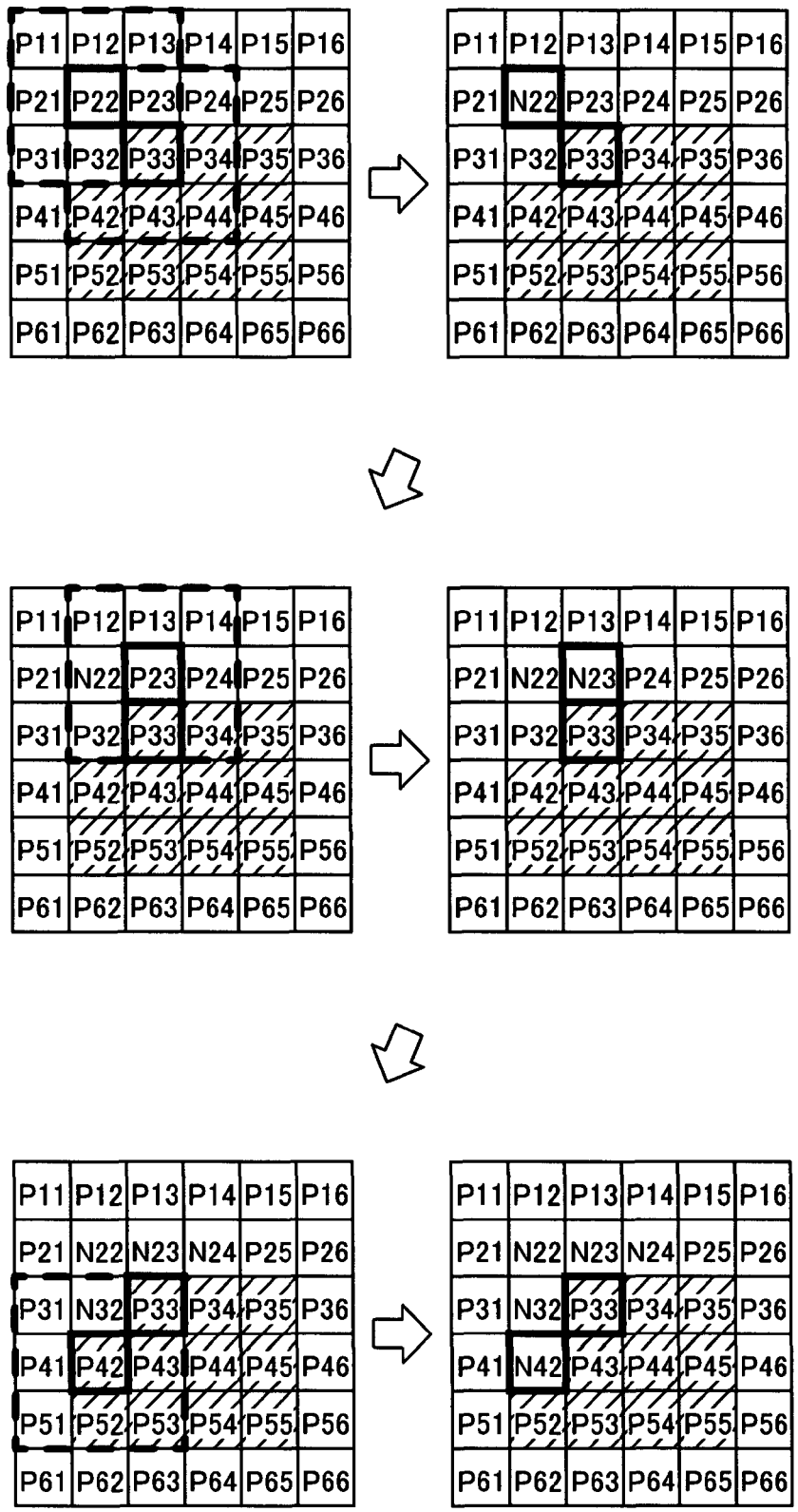
FIG. 33A is a first explanatory diagram of the dust removal process of the present embodiment.
Figure 33B:
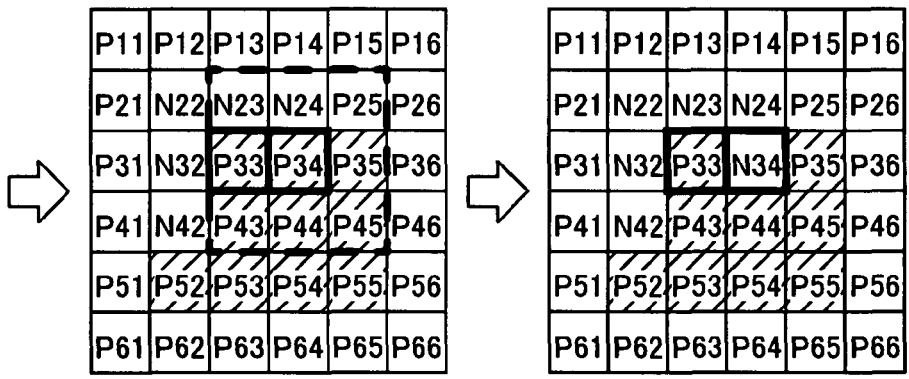
FIG. 33B is a second explanatory diagram of the dust removal process of the present embodiment.
Figure 33B:
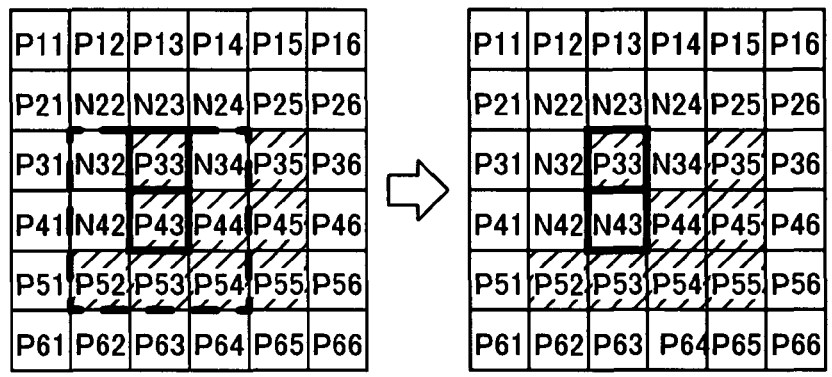
Figure 33B:
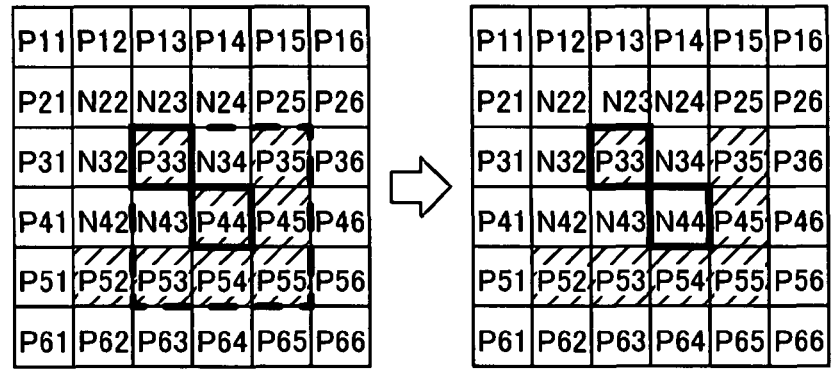
Figure 33C:
FIG. 33C is a third explanatory diagram of the dust removal process of the present embodiment.
Figure 33C:
Figure 33C:
Figure 33C:
Figure 33C:
Figure 33C:
Figures 34, 35:
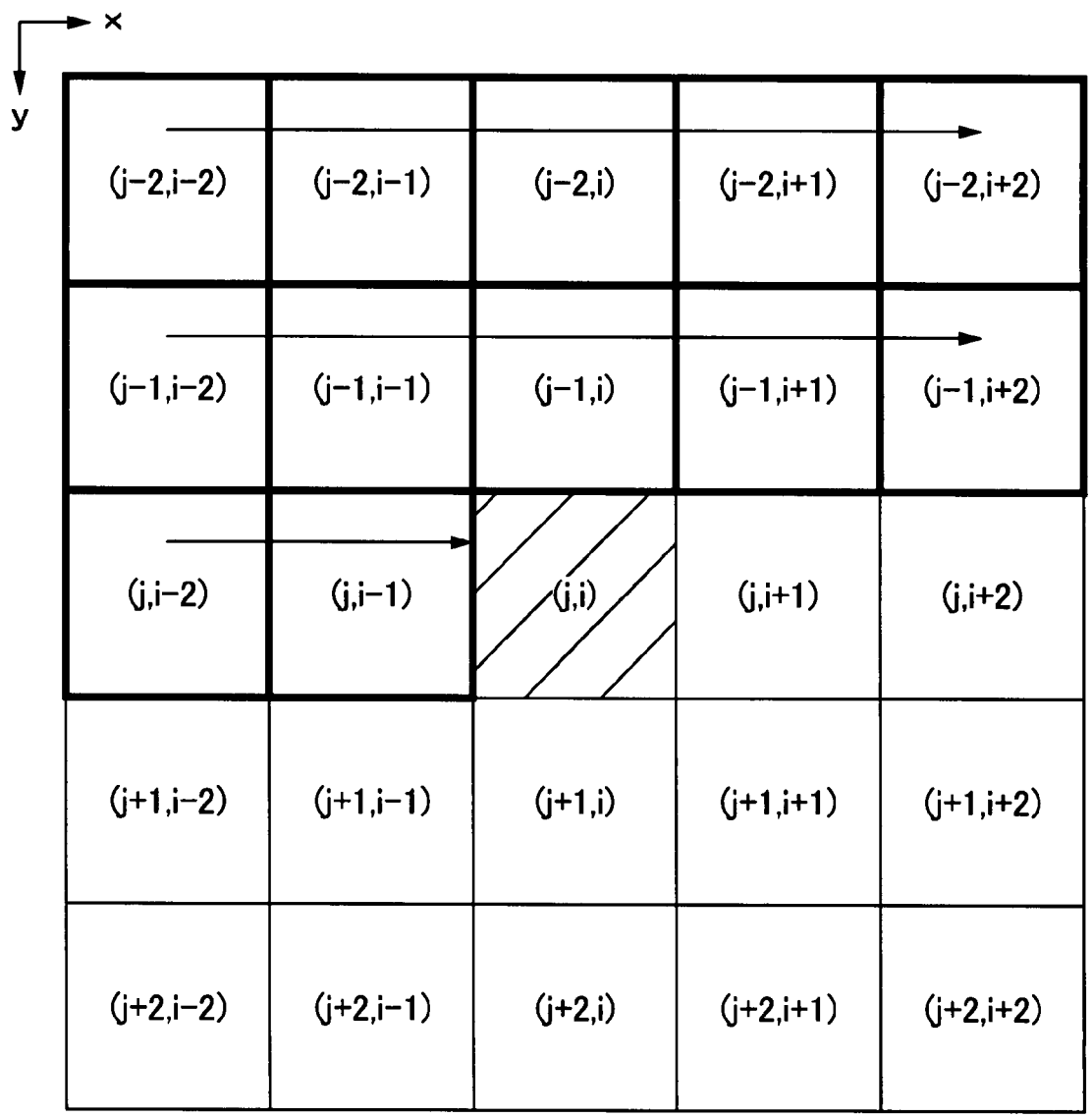
FIG. 34 is an explanatory diagram showing the order in which the filtering process is performed on neighborhood pixels.
FIG. 35 is an explanatory diagram of dust pixel search in S301.

FIG. 32 is a flowchart of the dust removal process of the present embodiment. The dust removal process is performed by the scanner driver causing the computer 3 to perform image processing after the dust detection process. That is, the scanner driver includes a program code for causing the computer 3 to perform various processes in FIG. 32. FIGS. 33A to 33C are explanatory diagrams of the dust removal process of the present embodiment. FIG. 34 is an explanatory diagram showing the order in which the filtering process is performed on the neighborhood pixels.

The computer 3 first searches for the dust pixel (S301). The position of the dust pixel to be searched for is the position of the white pixel saved in S168 described above. Firstly, the search is performed in order from the upper left pixel to the right side, and such search from the left side to the right side is performed sequentially from the top. Specifically, the computer 3 searches for the dust pixel in the following order: pixel (1, 1), pixel (1, 2), . . . pixel (1, 6), pixel (2, 1), pixel (2, 2), . . . In this case, the pixel (3, 3) is the first pixel retrieved as the dust pixel (see the upper left figure in FIG. 33A).

Next, the computer 3 replaces the pixel data of the neighborhood pixel, instead of the pixel data of the pixel of interest, with the median value of the pixel data of the non-dust pixels in the neighborhood area of that neighborhood pixel (S302). Specifically, the computer 3 firstly performs a filtering process similar to the median filtering process on each of the pixels in the neighborhood area, not on the pixel of interest (S302). In this case, if the number of the non-dust pixels in the neighborhood area of the neighborhood pixel is any even number, there will be two pixels that represent the median value. The average value of the pixel data of such two pixels is used as the median value of the pixel data of the non-dust pixels in the neighborhood area of the neighborhood pixel. Although the median value is obtained based on the pixel data of the non-dust pixels, if the pixel data of the dust pixel has already been replaced with the pixel data of a non-dust pixel, such replaced pixel data is used to calculate the median value.

Now, the process in S302 is described in detail.

First, the computer 3 replaces the pixel data of the pixel (2, 2), which corresponds to the first pixel in FIG. 34, with the median value of the pixel data of the non-dust pixels in the neighborhood area of the pixel (2, 2) (see the upper left and upper right figures in FIG. 33A). The computer 3 obtains the brightness data (Y data) of eight pieces of pixel data, P11, P12, P13, P21, P22, P23, P31, and P32, obtains the median value of these eight pieces of brightness data, and then sets the pixel data of the pixel (2, 2) to the pixel data of the pixel that represents the median value. Since the number of the non-dust pixels in the neighborhood area of the pixel (2, 2) is eight, which is an even number, there are two pixels that represent the median value. Therefore, the pixel data of the pixel (2, 2) is set to the average value of the pixel data of these two pixels. The new pixel data of the pixel (2, 2) is indicated as "N22" (see the upper right figure in FIG. 33A).

Then, the computer 3 replaces the pixel data of the pixel (2, 3), which corresponds to the second pixel in FIG. 34, with the median value of the pixel data of the non-dust pixels in the neighborhood area of the pixel (2, 3) (see the central figures on the left and right sides of FIG. 33A). The computer 3 obtains the brightness data (Y data) of seven pieces of pixel data, P12, P13, P14, N22, P23, P24, and P32, obtains the median value of these seven pieces of brightness data, and then sets the pixel data of the pixel (2, 3) to the pixel data of the pixel that represents the median value. The new data of the pixel (2, 3) is indicated as "N23" (see the central figure on the right side in FIG. 33A).

Similarly, the computer 3 performs a similar filtering process on the pixels that correspond to the third and fourth pixels in FIG. 34 ((pixels (3, 2) and (2, 4)). The new pixel data of the pixels (3, 2) and (2, 4) are indicated respectively as "N32" and "N24".

Then, the computer 3 replaces the pixel data of the pixel (4, 2), which corresponds to the fifth pixel in FIG. 34, with the median value of the pixel data of the non-dust pixels in the neighborhood area of the pixel (4, 2) (see the central figures on the left and right sides in FIG. 33A). The computer 3 obtains the brightness data (Y data) of four pieces of pixel data, P31, N32, P41 and P51, obtains the median value of these four pieces of brightness data, and sets the pixel data of the pixel (4, 2) to the pixel data of the pixel that represents the median value. Accordingly, the pixel data of the pixel (4, 2), which has been the dust pixel, is replaced with the pixel data of a non-dust pixel. The new pixel data of the pixel (4, 2) is indicated as "N42" (see the lower right figure in FIG. 33A).

Similarly, the computer 3 performs a similar filtering process on the pixel (3, 4), which corresponds to the sixth pixel in FIG. 34 (see the upper left and upper right figures in FIG. 33B). As a result, the pixel data of the pixel (3, 4), which has been the dust pixel, is replaced with the pixel data of a non-dust pixel after the filtering process. The new pixel data of the pixel (3, 4) is indicated as "N34" (see the upper right figure in FIG. 33B).

Then, the computer 3 performs a similar filtering process on the pixel (4, 3), which corresponds to the seventh pixel in FIG. 34 (see the central figures on the left and right sides of FIG. 33B). At this time, the pixel data of the pixels (4, 2) and (3, 4), which were dust pixels, have already been replaced with the pixel data of non-dust pixels. Therefore, although there was only one non-dust pixel (only pixel (3, 2)) in the neighborhood area of the pixel (4, 3), at this stage, there are three non-dust pixels in the neighborhood area. The computer 3 obtains the brightness data (Y data) of these three pieces of pixel data, N32, N34 and N42, obtains the median value of the three pieces of brightness data, and sets the pixel data of the pixel (4, 3) to the pixel data of the pixel that represents the median value. Accordingly, the pixel data of the pixel (4, 3), which has been the dust pixel, is replaced with the pixel data of a non-dust pixel. The new pixel data of the pixel (4, 3) is indicated as "N43" (see the central figure on the right side of FIG. 33B)

Lastly, the computer 3 performs a similar filtering process on the pixel (4, 4), which corresponds to the eighth pixel in FIG. 34 (see the bottom figures on the left and right sides of FIG. 33B). At this time, the pixel data of the pixels (3, 4) and (4, 3), which were dust pixels, have already been replaced with the pixel data of non-dust pixels. Therefore, although no non-dust pixel was present first in the neighborhood area of the pixel (4, 4), at this stage, there are two non-dust pixels in the neighborhood area. The computer 3 obtains as the median value the average value of the two pieces of the pixel data N34 and N43, and sets the pixel data of the pixel (4, 4) to the obtained value. Accordingly, the pixel data of the pixel (4, 4), which was the dust pixel, is replaced with the pixel data of a non-dust pixel. The new pixel data of the pixel (4, 4) is indicated as "N44" (see the lower right figure in FIG. 33B).

With the above processes, the process in S302 is completed. When the process in S302 is completed, as shown in the lower right figure in the FIG. 33B, the pixel data of the neighborhood pixels of the pixel of interest (3, 3) have been replaced with the pixel data of non-dust pixels.

Then, the computer 3 replaces the pixel data of the pixel of interest with the median value of the pixel data of the neighborhood area of the pixel of interest (S303). In this case, the pixel (3, 3) is the pixel of interest. Therefore, the computer 3 obtains the brightness data (Y data) of the nine pieces of pixel data, N22, N23, N24, N32, P33, N34, N42, N43 and N44, obtains the median value of these nine pieces of brightness data, and sets the pixel data of the pixel (3, 3) to the pixel data of the pixel that represents the median value (see the upper left figure in FIG. 33C).

Since eight out of nine pixels in the neighborhood area of the pixel of interest (pixels other than the pixel of interest) are not dust pixels, it is highly likely that the non-dust pixel represents the median value. Especially in the present embodiment, since pixels around the dust pixel are pixels in the uniform region, the pixel data of the non-dust pixels in the neighborhood area are similar to each other. As a result, the pixel data P33, which represents the dust pixel, has a unique value compared with the pixel data of the non-dust pixels. Therefore, it is highly likely that the non-dust pixel represents the median value. That is, the pixel data of the pixel (3, 3), which was the dust pixel, is replaced with the pixel data of a non-dust pixel. The new pixel data of the pixel (3, 3) is indicated as "N33" (see the upper right figure in FIG. 33C).

With the above process, the pixel data of the pixel (3, 3), which is the dust pixel, is replaced, and the dust pixel in this position is removed. Accordingly, the computer 3 deletes the position of the pixel (3, 3) from the positions of the white pixels saved in S168 described above. As a result, the scope corresponding to the positions of the white pixels saved is as shown with a thick line in the central figure on the left side of FIG. 33C.

The computer 3 determines whether or not processing all the dust pixels is completed (S304), and if there is any unprocessed dust pixel, repeats the above-described processes in S301 to S304. Here, since there are unprocessed dust pixels, determination in S304 is "NO".

Then, the pixel (3, 4) is detected as the dust pixel in S301 (see the central figure on the right side of FIG. 33C). In S302, the computer 3 performs the filtering process on the neighborhood pixels in the following order: pixel (2, 3), pixel (2, 4), pixel (3, 3), pixel (2, 5), pixel (4, 3), pixel (3, 5), pixel (4, 4) and pixel (4, 5). When the pixel data Nji, which has already undergone replacement, is replaced again, the corresponding new pixel data is indicated as "NNji" (see the lower left figure in FIG. 33C). Then, in S303, the computer 3 replaces the pixel data of the pixel of interest (3, 4) with the median value of the pixel data of the neighborhood area of the pixel of interest. The new pixel data of the pixel (3, 3) is indicated as "NN33" (see the lower right figure in FIG. 33C).

The computer 3 repeats the processes described above to convert the pixel data of the remaining dust pixels. When processing all the dust pixels is completed ("YES" in S304), the computer 3 terminates the dust removal process.

As described above, in the present embodiment, the filtering process is performed first on the neighborhood pixels of the pixel of interest (S302) and thereafter, the median filtering process is performed on the pixel of interest. As a result, the dust image portion shows gradual change in image, and allows the image after the dust removal process to have natural image quality. In addition, when the median filtering process is performed on the pixel of interest, there is a low possibility that the dust pixel represents the median value. Therefore, the possibility is also low that the pixel data of a dust pixel is replaced with the pixel data of another dust pixel. As a result, the dust images can be removed.

Figure 28C:
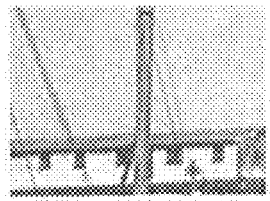
FIG. 28C is an image obtained as a result of performing a dust removal process of the present embodiment on the dust image of FIG. 28A.

FIG. 28C is an image obtained as a result of performing the dust removal process of the present embodiment on the dust image of FIG. 28A. Dust images are completely removed as a result of the dust removal process. Comparison of the image of FIG. 28C with the image of FIG. 28B reveals that in the FIG. 28C the mast image in the central area, stay (wire rope) image extending obliquely downward from the upper left corner, and lower right window images of the building are not damaged.

Now, the reason why the filtering process is performed on the neighborhood pixels in the order shown in FIG. 34 is described. As described below, the order shown in FIG. 34 relates to the dust pixel search (S301).

FIG. 35 is an explanatory diagram of the dust pixel search in S301. The signs in the grids that indicate pixels indicate the positions of the pixels. In the dust pixel search (S301), the search is performed from the upper left pixel to the right side, and such search from the left side to the right side is performed sequentially from the top. In this case, it is assumed that the pixel (j, i) hatched with diagonal lines has been detected as the dust pixel.

Detection of the pixel (j, i) as the dust pixel means that the pixels that have undergone the search (pixels indicated with the thick line in FIG. 35) are not dust pixels. That is, the pixels located on the upper side of the pixel (j, i) (namely, the minus side in the y direction) are not dust pixels, and the pixels on the same y direction level as the pixel (j, i) that are present to the left of the pixel (j, i) (the minus side in the x direction) are not dust pixels, either. Especially, it is understood that the pixel (j−1, i−1) on the upper left of the pixel (j, i), the pixel (j−1, i) above the pixel (j, i), the pixel (j−1, i+1) on the upper right of the pixel (j, i) and the pixel (j, i−1) on the left of the pixel (j, i) are not dust pixels.

On the other hand, it is not known whether or not each of the pixels that have not undergone the search (the pixels other than the pixels indicated with the thick line in FIG. 35) is the dust pixel. Specifically, whether or not to be the dust pixel is not known with respect to the pixels on the lower side of the pixel (j, i) (the plus side in the y direction), and also the pixels on the same y direction level as the pixel (j, i) that are present to the right (the plus side in the x direction) of the pixel (j, i). Especially, whether or not to be the dust pixel is not known with respect to the pixel (j, i+1) on the right of the pixel (j, i), the pixel (j+1, i−1) on the lower left of the pixel (j, i), the pixel (j+1, i) below the pixel (j, i) and the pixel (j+1, i+1) on the lower right of the pixel (j, i).

In view of this, in the present embodiment, the pixels that have already undergone the search are given priority over the pixels that have not undergone the search yet, with respect to the neighborhood pixel processing order in S302. More specifically, as shown in FIG. 34, the orders of the pixels on the upper left, above, on the upper right and on the left (the orders 1 to 4) of the pixel of interest are earlier than the orders of the pixels on the right, on the lower left, below and on the lower right (the orders 5 to 8) of the pixel of interest.

Also in the present embodiment, even among the pixels that have already undergone the search, the pixels on the left side (the minus side in the x direction) are given priority over the pixels on the right side with respect to the neighborhood pixel processing order in S302. More specifically, as shown in FIG. 34, the order of the upper left pixel (the first order) is earlier than the order of the pixel above (the second order), and the order of the pixel above (the second order) is earlier than the order of the upper right pixel (the fourth order). The reason for this is as follows. The pixels on the left side include more pixels that have undergone the search in the neighborhood area thereof from the beginning.

Therefore, the pixels on the left side can achieve favorable filtering process results since it is possible to take more pixel data into account in obtaining the median value. If the pixels on the right side are given priority, for example, the filtering process results of the pixel above (unfavorable process results) give adverse effects on the filtering process of the upper left pixel, thereby deteriorating the filtering process results of the upper left pixel.

In a similar manner, in the present embodiment, even among the pixels that have already undergone the search, the pixels on the upper side (the minus side in the y direction) are given priority over the pixels on the lower side with respect to the neighborhood pixel processing order in S302. More specifically, as shown in FIG. 34, the order of the upper left pixel (the first order) is earlier than the order of the pixel on the left (the third order). The reason for this is as follows. The pixels on the upper side include more pixels that have undergone the search in the neighborhood area thereof from the beginning. Therefore, the pixels on the upper side can achieve favorable filtering process results since it is possible to take more pixel data into account in obtaining the median value. If the pixels on the lower side are given priority, for example, the filtering process results of the pixel on the left (unfavorable process results) give adverse effects on the filtering process of the upper left pixel, thereby deteriorating the filtering process results of the upper left pixel.

It should be noted that with respect to the upper right pixel and the pixel on the left, since the filtering process results of one of them do not give effects on the filtering process results of the other, the orders thereof indicated in FIG. 34 (the third and fourth orders) may be reversed.

Also, in the present embodiment, even among the pixels that have not undergone the search yet, the pixels on the left side (the minus side in the x direction) are given priority over the pixels on the right side with respect to the neighborhood pixel processing order in S302. More specifically, as shown in FIG. 34, the order of the lower left pixel (the fifth order) is earlier than the order of the pixel below (the seventh order), and the order of the pixel below (the seventh order) is earlier than the order of the lower right pixel (the eighth order). This is because the pixels on the left side include more pixels that have undergone the search in the neighborhood area thereof from the beginning. In addition, performing the filtering process while giving the left side pixels (the minus side in the x direction) priority over the right side pixels enables to take more pixel data into account in obtaining the median value during the filtering process on the right side pixels (for example, when the filtering process on the pixel (4, 3) shown in the central figure on the left side of FIG. 33B is performed, it is possible to obtain the median value based on three pieces of pixel data). If the pixels on the right side are given priority, for example, when the filtering process is performed on the right side pixels, the median value is obtained based on lesser pixel data.

In a similar manner, in the present embodiment, even among the pixels that have not undergone the search yet, the pixels on the upper side (the minus side in the y direction) are given priority over the pixels on the lower side with respect to the neighborhood pixel processing order in S302. More specifically, as shown in FIG. 34, the order of the pixel on the right (the sixth order) is earlier than the order of the lower right pixel (the eighth order). This is because the pixels on the upper side include more pixels that have undergone the search in the neighborhood area thereof from the beginning. In addition, performing the filtering process while giving the upper side pixels (the minus side in the y direction) priority over the lower side pixels enables to take more pixel data into account in obtaining the median value during the filtering process on the lower side pixels (for example, when the filtering process of the pixel (4, 4) shown in the lower left figure in FIG. 33B is performed, it is possible to obtain the median value based on two pieces of pixel data). If the pixels on the lower side are given priority, for example, when the filtering process is performed on the lower side pixels, the median value is obtained based on lesser pixel data.

It should be noted that with respect to the pixel on the right and the lower left pixel, since the filtering process results of one of them do not give effects on the filtering process results of the other, the orders thereof indicated in FIG. 34 (the fifth and sixth orders) may be reversed.

As a conclusion, in the present embodiment, as a result of performing the filtering process on the neighborhood pixels in S302 in accordance with the order indicated in FIG. 34, when the median filter is applied to the pixel of interest in S303, the possibility is extremely low that the dust pixel represents the median value. Therefore, there is no possibility that the pixel data of a dust pixel is replaced with the pixel data of another dust pixel, and the dust images can be completely removed.

Other Embodiment

A multifunctional machine, etc. as an embodiment of the invention is described above, but the foregoing embodiment of the invention is for the purpose of elucidating the invention and is not to be interpreted as limiting the invention. The invention can of course be altered and improved without departing from the gist thereof and includes functional equivalents.

Dust Images

In the foregoing embodiment, the dust image is described as the defective image. However, the defective image is not limited to the dust image. For example, the defective image may be noise included in the original image. With a similar method to the above-described dust removal method, defective images such as noise included in the original image can be detected, and with a similar method to the above-described dust removal method, defective images such as noise included in the original image can be removed.

Scanner Driver

In the foregoing embodiment, the scanner driver causes the computer 3 to perform the dust detection process and dust removal process. However, there is no limitation to this. An image processing program separate from the scanner driver may be installed on the computer 3 to cause the computer 3 to perform the dust detection process and the dust removal process. In addition, the dust detection process and the dust removal process may be performed by separate programs.

Also in the foregoing embodiment, the dust detection process and dust removal process are performed at the scanner function mode. However, there is no limitation to this. For example, the dust detection process and dust removal process may be performed at the copier function mode. In such a case, the controller 60 performs the dust detection process and dust removal process on the image data obtained from the scanner section 10.

Regarding S302

In the foregoing embodiment, the computer 3 performs the filtering process on all the neighborhood pixels of the pixel of interest in S302. However, the computer 3 may perform the filtering process only on the dust pixels in the neighborhood area of the pixel of interest in S302. Also, in S302, the computer 3 may perform the filtering process only on the pixels that have not undergone the search in the neighborhood area of the pixel of interest. In this manner, it is possible to reduce the number of times of the filtering process and make the processing speed of the dust removal process faster.

General Summary (1-1) In the foregoing embodiment, the computer 3 initially performs the edge tracking process on the brightness image of the original image to obtain the edge image (see S102 in FIG. 12, FIGS. 15A to 15C, FIG. 16). Then, the computer 3 performs the erosion process (see S104 in FIG. 12, FIG. 18) after the expansion process (see S103 in FIG. 12, FIG. 17) on the edge image to obtain the processed image (see FIG. 21). Then, the computer 3 detects from the processed image a white image (isolation point) whose size is equal to or smaller than a predetermined size (S163), and detects the dust image in the original image based on the detected white image.

In this manner, it is possible to detect the dust image in the uniform region of the original image with good accuracy. Although detection of the dust image in the non-uniform region is difficult by this method, since the dust image in the non-uniform region is less noticeable, it is not a problem. Even if the dust image in the non-uniform region can be detected, it is difficult to remove the dust image. Therefore, no substantial problem occurs even if the dust image in the non-uniform region cannot be detected.

(1-2) In the foregoing embodiment, the computer 3 stores the position of a white image in the processed image in a memory, and detects as the dust image the image in the original image that corresponds to the position of that white image in the processed image. In this manner, it is possible to detect the position of the dust image included in the original image.

However, the method for detecting the dust image is not limited to methods involving detection of the position of the dust image in the original image. For example, the method may involve detection of the presence of the dust image in the original image. In this case, the computer 3 detects the presence of the dust image in the original image based on whether or not a white image whose size is equal to or smaller than a predetermined size is present in the processed image.

(1-3) In the foregoing embodiment, the computer 3 obtains the brightness image based on the original image during the edge tracking process, and obtains the edge image by applying the Sobel filter to the brightness image. In this manner, it is possible to obtain the edge image indicating the contour of the target object in the original image.

However, the edge image may be obtained by any other methods. For example, the Roberts filter or Prewitt filter may be used instead of the Sobel filter. If the original image is a monochrome image, the Sobel filter may be applied without obtaining the brightness image.

(1-4) In the above-described expansion process, the computer 3 sets the pixel data of a pixel of interest to [1] (replaces the pixel of interest with the white pixel, which is the same as the edge pixel), when the pixel data (edge pixel data) of any of the pixels in the neighborhood area of the pixel of interest is [1] (when any edge pixel is included in the neighborhood area). In the above-described erosion process, the computer 3 sets the pixel data that corresponds to a pixel of interest to [0] (replaces the pixel of interest with the black pixel, which is different from the edge pixel), when the pixel data of any of the pixels in the neighborhood area of the pixel of interest is [0] (when any non-edge pixel is included in the neighborhood area).

In this manner, by performing the erosion process after the expansion process, white images in the non-uniform region are joined to each other, and the size of the white image region in the non-uniform region becomes larger than a predetermined size. In addition, white images which are discontinued images in the edge image are joined to each other, and the size of the white image region becomes larger than a predetermined size. For this reason, it becomes possible to detect the dust image in the original image by detecting the white image whose size is equal to or smaller than a predetermined size in the processed image.

(1-5) In the foregoing embodiment, the neighborhood area in the expansion process and that in the erosion process have the same size. Accordingly, even if the erosion process is performed after the expansion process, the outer contour of the white image does not change. Consequently, it is possible to detect the dust image in the original image in an adequate size (not too large or too small).

If the neighborhood area in the expansion process is set larger than the neighborhood area in the erosion process, the size of the white image in the processed image will be larger than the actual dust image. On the contrary, if the neighborhood area in the expansion process is set smaller than the neighborhood area in the erosion process, the size of the white image in the processed image will be smaller than the actual dust image.

(1-6) In the foregoing embodiment, the computer 3 changes the size of the neighborhood area depending on the reading resolution of the original used in obtaining the original image. For example, when the resolution is set to "4,800 dpi", the computer 3 sets the neighborhood area to the area of 7×7 pixels, and when the resolution is set to "2,400 dpi", the computer 3 sets the neighborhood area to the area of 5×5 pixels. In this manner, the neighborhood area can be changed depending on the degree of concentration of the white images in the edge image, so that the white pixels in the non-uniform region are joined to each other.

(1-7) In the foregoing embodiment, the shape of a white image (isolation point) in the processed image is obtained, and the method for determining whether or not the white image relates to the dust image is changed depending on the obtained shape.

(1-8) For example, when a white image is determined to be spot-shaped ("YES" in S165 in FIG. 23), the white image having a value smaller than the threshold value C1 (first threshold value) is determined to be related to the dust image (see S166). On the other hand, when a white image is determined to be line-shaped ("NO" in S165 in FIG. 23), the white image having a value smaller than the threshold value C2 (second threshold value) is determined to be related to the dust image (see S167). By setting the threshold values C1 and C2 to different values, the method for determining whether or not the white image relates to the dust image is changed depending on the shape of the white image. In addition, since the threshold value C1 is smaller than the threshold value C2, erroneous detection of the image of the target object present in the uniform region as the dust image can be suppressed.

(1-9) In the foregoing embodiment, the rectangular region that surrounds a white image (isolation point) in the processed image is determined (see FIG. 24), and the method for determining whether or not the white image relates to the dust image is changed depending on the ratio R of the area S of the white image to the area (b×b) of the square whose side length is equal to the longer side length of the rectangular region.

(1-10) For example, a white image is considered to be spot-shaped if the ratio R is larger than the threshold value C0 (predetermined value) ("YES" in S165 in FIG. 23). Therefore, the white images having a value smaller than the threshold value C1 (first threshold value) is determined to be related to the dust image (see S166). On the other hand, a white image is considered to be line-shaped if the ratio R is equal to or smaller than the threshold value C0 ("NO" in S165 in FIG. 23). Therefore, the white image having a value smaller than the threshold value C2 (second threshold value) is determined to be related to the dust image (see S167). By setting the threshold values C1 and C2 to different values, the method for determining whether or not the white image relates to the dust image is changed depending on the shape of the white image. In addition, since the threshold value C1 is smaller than the threshold value C2, erroneous detection of the image of the target object present in the uniform region as the dust image can be suppressed.

(1-11) It is preferable to include all the constituent elements of the foregoing embodiment, since it achieves the entire effects of the invention. However, it is not required to include all the constituent elements of the foregoing embodiment. For example, the effect of the dust detection method of the present embodiment can be achieved even by using other dust removal methods.

(1-12) The above-described computer 3 functions as an image processing apparatus since the scanner driver, which is an image processing program, is installed thereon. The scanner driver causes the computer 3 to perform the edge tracking process on the brightness image of the original image and obtain the edge image (see S102 in FIG. 102, FIGS. 15A to 15C, FIG. 16). Then, the scanner driver causes the computer 3 to perform the erosion process (see S104 in FIG. 12, FIG. 18) after the expansion process on the edge image (see S103 in FIG. 12, FIG. 17) and obtain the processed image (see FIG. 21). The scanner driver causes the computer 3 to detect a white image (isolation point) whose size is equal to or smaller than a predetermined size in the processed image (see S163), and detect the dust image in the original image based on the detected white image.

The above-described program is not required to be provided as the scanner driver. Such an image processing program may cause the computer 3 to perform predetermined processes as ordinary image processing software.

(1-13) The above-described computer 3 includes, although not shown, an arithmetic processing section such as a CPU and a storing section such as a memory. Then, the CPU of the computer 3 performs the edge tracking process on the original image, and stores the edge image in the memory (see S102 in FIG. 12, FIGS. 15A to 15C, FIG. 16). Then, the CPU of the computer 3 performs the erosion process (see S104 in FIG. 12, FIG. 18) after the expansion process (see S103 in FIG. 12, FIG. 17) on the edge image, and stores the processed image in the memory (see FIG. 21). The CPU of the computer 3 detects from the processed image a white image (isolation point) whose size is equal to or smaller than a predetermined size, and detects the dust image in the original image based on the detected white image. In this manner, the above-described computer 3 functions as an image processing apparatus.

(2-1) In the foregoing embodiment, the computer 3 extracts a white image (isolation point) whose size is equal to or smaller than a predetermined size from the processed image obtained from the original image (S101 to S106 in FIG. 12, S161 to S163 in FIG. 23). Then, the computer 3 determines the determination method that corresponds to the characteristics of the white image from among two determination methods. Specifically, the computer 3 determines the determination method that corresponds to the shape of the white image (S165 in FIG. 23). Then, the computer 3 determines whether or not the white image relates to the dust image based on the determined determination method (S166 to S168 in FIG. 23). The computer 3 detects the dust image from the original image based on the isolation point related to the dust image.

In this manner, it is possible to detect the dust image in the original image with good accuracy.

Detection of the dust image is not limited to detection of the position of the dust image in the original image. For example, detection may be made with respect to the presence of the dust image in the original image. In such a case, the computer 3 detects the presence of the dust image in the original image based on whether or not a white image whose size is equal to or smaller than a predetermined size is present in the processed image.

(2-2) In the foregoing embodiment, the computer 3 obtains the shape of a white image (isolation point) whose size is equal to or smaller than a predetermined size, and determines the method for determining whether or not the white image relates to the dust image depending on the obtained shape (S166 to S168 in FIG. 23). In this manner, it is possible to detect the dust image in the original image with good accuracy.

(2-3) Specifically, when a white image (isolation point) whose size is equal to or smaller than a predetermined size is determined to be spot-shaped ("YES" in S165 in FIG. 23), the white image having a value smaller than the threshold value C1 (first threshold value) is determined to be related to the dust image (see S166). On the other hand, when a white image is determined to be line-shaped ("NO" in S165 in FIG. 23), the white image having a value smaller than the threshold value C2 (second threshold value) is determined to be related to the dust image (see S167). By setting the threshold values C1 and C2 to different values, the method for determining whether or not the white image relates to the dust image is changed depending on the shape of the white image.

(2-4) At that time, by setting the threshold value C1 to a value smaller than the threshold value C2, it is possible to suppress erroneous detection of the image of the target object as the dust image.

(2-5) In other words, in the foregoing embodiment, the rectangular region that surrounds a white image (isolation point) in the processed image is determined (see FIG. 24), and the method for determining whether or not the white image relates to the dust image is determined depending on the ratio R of the area S of the white image to the area of the square (b×b) whose side length is equal to the longer side length of the rectangular region (S166 to S168 in FIG. 23). In this manner, it is possible to detect the dust image in the original image with good accuracy.

(2-6) Specifically, when the ratio R is larger than the threshold C0 (predetermined value) ("YES" in S165 in FIG. 23), the white image is considered to be spot-shaped, and therefore the white image having a value smaller than the threshold value C1 (first threshold) is determined to be related to the dust image (see S166). On the other hand, when the ratio R is equal to or smaller than the threshold value C0 ("NO" in S165 in FIG. 23), the white image is considered to be line-shaped, and therefore the white image having a value smaller than the threshold value C2 (second threshold) is determined to be related to the dust image (see S167). By setting the threshold values C1 and C2 to different values, the method for determining whether or not the white image relates to the dust image is changed depending on the shape of the white image.

(2-7) At that time, by setting the threshold value C1 to a value smaller than the threshold value C2, it is possible to suppress erroneous detection of the image of the target object as the dust image.

(2-8) In the foregoing embodiment, the computer 3 obtains the edge image by initially performing the edge tracking process on the brightness image of the original image (see S102 in FIG. 12, FIGS. 15A to 15C, FIG. 16). Then, the computer 3 performs the erosion process (see S104 in FIG. 12, FIG. 18) after the expansion process (see S103 in FIG. 12, FIG. 17) on the edge image to obtain the processed image (see FIG. 21). The computer 3 detects from the processed image a white image (isolation point) whose size is equal to or smaller than a predetermined size (S163), and detects the dust image in the original image based on the detected white image.

In this manner, it is possible to detect the dust image in the uniform region of the original image with good accuracy. Although detection of the dust image in the non-uniform region is difficult by this method, the dust image in the non-uniform region is less noticeable, and therefore it is not a problem. Even if the dust image in the non-uniform region can be detected, it is difficult to remove the dust image. Therefore, no substantial problem occurs even if the dust image in the non-uniform region cannot be detected.

(2-9) It is preferable to include all the constituent elements of the foregoing embodiment, since it achieves the entire effects of the invention. However, it is not necessarily required to include all the constituent elements of the foregoing embodiment. For example, the effect of the dust detection method of the present embodiment can be achieved even by using other dust removal methods.

(2-10) The above-described computer 3 functions as an image processing apparatus since the scanner driver, which is an image processing program, is installed thereon. The scanner driver causes the computer 3 to extract a white image (isolation point) whose size is equal to or smaller than a predetermined size from the processed image obtained from the original image (S101 to S106 in FIG. 12, S161 to S163 in FIG. 23). Then, the scanner driver causes the computer 3 to determine the determination method that corresponds to the characteristics of the white image from among two determination methods. Specifically, the scanner driver causes the computer 3 to determine the determination method that corresponds to the shape of the white image (S165 in FIG. 23). Then, the scanner driver causes the computer 3 to determine whether or not the white image relates to the dust image based on the determined determination method (S166 to S168 in FIG. 23). The scanner driver causes the computer 3 to detect the dust image from the original image based on the isolation point related to the dust image.

The above-described program is not required to be provided as the scanner driver. Such an image processing program may cause the computer 3 to perform predetermined processes as ordinary image processing software.

(2-11) The above-described computer 3 includes, although not shown, an arithmetic processing section such as a CPU and a storing section such as a memory. The CPU of the computer 3 extracts a white image (isolation point) whose size is equal to or smaller than a predetermined size from the processed image obtained from the original image, which is stored in the memory (S101 to S106 in FIG. 12, S161 to S163 in FIG. 23). Then, the CPU of the computer 3 determines the determination method that corresponds to the characteristics of the white image from among two determination methods. Specifically, the CPU of the computer 3 determines the determination method that corresponds to the shape of the white image (S165 in FIG. 23). Then, CPU of the computer 3 determines whether or not the white image relates to the dust image based on the determined determination method (S166 to S168 in FIG. 23). The CPU of the computer 3 detects the dust image from the original image based on the isolation point related to the dust image. In this manner, the above-described computer 3 functions as an image processing apparatus.

What is claimed is:

1. A method for detecting a defective image comprising:
   obtaining an edge image by performing an edge tracking process on an original image;
   obtaining a processed image by performing an erosion process after an expansion process on the edge image;
   detecting an isolation point having a size equal to or smaller than a predetermined size from said processed image; and
   storing a position of the isolation point in the processed image, and detecting an image in the original image that corresponds to the position as the defective image,
   wherein
   a rectangular region that surrounds the isolation point is determined, when a ratio of an area occupied by the isolation point to an area of a square whose side length is equal to a longer side length of the rectangular region is larger than a predetermined value, the position of the isolation point having a ratio smaller than a first threshold value is stored,
   when the ratio is smaller than the predetermined value, the position of the isolation point having a ratio smaller than a second threshold value is stored, and
   the first threshold value is smaller than the second threshold value.

2. A method for detecting a defective image according to claim 1,
   wherein in the edge tracking process, a brightness image is obtained from the original image, and the edge image is obtained by applying a filter to the brightness image.

3. A method for detecting a defective image according to claim 1,
   wherein in the expansion process, when an edge pixel is present in a neighborhood area of a pixel of interest, the pixel of interest is converted to the same pixel as the edge pixel, and,
   in the erosion process, when a non-edge pixel is present in a neighborhood area of a pixel of interest, the pixel of interest is converted to a pixel that is not the edge pixel.

4. A method for detecting a defective image according to claim 3,
   wherein the neighborhood area in the expansion process and the neighborhood area in the erosion process have the same size.

5. A method for detecting a defective image according to claim 3,
   wherein the size of the neighborhood area is changed in accordance with a reading resolution of an original used in obtaining the original image.

6. A tangible storage medium storing a program, the program comprising:
   a code for obtaining an edge image by performing an edge tracking process on an original image;
   a code for obtaining a processed image by performing an erosion process after an expansion process on the edge image,
   a code for detecting an isolation point having a size equal to or smaller than a predetermined size, from the processed image; and
   a code for storing a position of the isolation point in the processed image, and detecting an image in the original image that corresponds to the position as the defective image,
   wherein
   a rectangular region that surrounds the isolation point is determined, when a ratio of an area occupied by the isolation point to an area of a square whose side length is equal to a longer side length of the rectangular region is larger than a predetermined value, the position of the isolation point having a ratio smaller than a first threshold value is stored,
   when the ratio is smaller than the predetermined value, the position of the isolation point having a ratio smaller than a second threshold value is stored, and
   the first threshold value is smaller than the second threshold value.

7. A method for detecting a defective image comprising:
   extracting an isolation point from an original image,
   determining a determination method that corresponds to a characteristic of the isolation point from among a plurality of determination methods;
   determining whether or not a position of the isolation point is to be stored, based on the determined determination method; and
   detecting an image in the original image that corresponds to the position as the defective image,
   wherein
   when the determination method that corresponds to the characteristic of the isolation point is determined from among the plurality of determination methods,
   a rectangular region that surrounds the isolation point is determined, and when a ratio of an area occupied by the isolation point to an area of a square whose side length is equal to a longer side length of the rectangular region is larger than a predetermined value, whether or not the position of the isolation point is to be stored based on a first threshold value is determined,
   when the ration is equal to or smaller than the predetermined value, whether or not the position of the isolation point is to be stored base don a second threshold value that is different from the first threshold value is determined.

8. A method for detecting a defective image according to claim 7,
wherein the first threshold value is smaller than the second threshold value.

9. A method for detecting a defective image according to claim 7,
wherein when the isolation point is extracted from the original image, an edge image is obtained by performing an edge tracking process on the original image, and an isolation point whose size is equal to or smaller than a predetermined size is detected from a processed image obtained by performing an erosion process after an expansion process on the edge image.

10. A tangible storage medium storing a program, the program comprising:
a code for extracting an isolation point from an original image;
a code for determining a determination method that corresponds to a characteristic of the isolation point from among a plurality of determination methods;
a code for determining whether or not a position of the isolation point is to be stored based on the determined determination method; and,
a code for detecting an image in the original image that corresponds to the position as the defective image,
wherein
when the determination method that corresponds to the characteristic of the isolation point is determined from among the plurality of determination methods,
a rectangular region that surrounds the isolation point is determined, and when a ratio of an area occupied by the isolation point to an area of a square whose side length is equal to a longer side length of the rectangular region is larger than a predetermined value, whether or not the position of the isolation point is to be stored based on a first threshold value is determined,
when the ration is equal to or smaller than the predetermined value, whether or not the position of the isolation point is to be stored base don a second threshold value that is different from the first threshold value is determined.

* * * * *